US009892442B2

(12) United States Patent  
Barday

(10) Patent No.: US 9,892,442 B2
(45) Date of Patent: *Feb. 13, 2018

(54) DATA PROCESSING SYSTEMS AND METHODS FOR EFFICIENTLY ASSESSING THE RISK OF PRIVACY CAMPAIGNS

(71) Applicant: OneTrust, LLC, Atlanta, GA (US)

(72) Inventor: Kabir A. Barday, Atlanta, GA (US)

(73) Assignee: OneTrust, LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/619,212

(22) Filed: Jun. 9, 2017

(65) Prior Publication Data

US 2017/0287030 A1    Oct. 5, 2017

Related U.S. Application Data

(63) Continuation-in-part of application No. 15/256,419, filed on Sep. 2, 2016, now Pat. No. 9,691,090, which is a continuation of application No. 15/169,643, filed on May 31, 2016.

(60) Provisional application No. 62/317,457, filed on Apr. 1, 2016, provisional application No. 62/360,123, filed on Jul. 8, 2016, provisional application No.
(Continued)

(51) Int. Cl.
G06Q 10/10 (2012.01)
G06Q 40/08 (2012.01)
G06F 21/31 (2013.01)
G06Q 30/06 (2012.01)
G06Q 10/06 (2012.01)
G06Q 50/26 (2012.01)

(52) U.S. Cl.
CPC . *G06Q 30/0609* (2013.01); *G06Q 10/063114* (2013.01); *G06Q 50/265* (2013.01)

(58) Field of Classification Search
CPC ....... G06Q 30/0609; G06Q 10/063114; G06Q 50/265
USPC .......................................... 705/1.1–912, 325
See application file for complete search history.

(56) References Cited

U.S. PATENT DOCUMENTS 5,276,735 A    1/1994 Boebert et al.
6,816,944 B2   11/2004 Peng
(Continued)

FOREIGN PATENT DOCUMENTS

WO    2015116905    8/2015

OTHER PUBLICATIONS

International Search Report, dated Jun. 21, 2017, from corresponding International Application No. PCT/US2017/025600.
(Continued)

*Primary Examiner* — Jonathan P Ouellette
(74) *Attorney, Agent, or Firm* — Brient Globerman, LLC

(57) ABSTRACT

Data processing systems and methods, according to various embodiments are adapted for efficiently processing data to allow for the streamlined assessment of the risk level associated with particular privacy campaigns. The systems may provide a centralized repository of templates of privacy-related question/answer pairings for various vendors, products (e.g., software products), and services. Different entities may electronically access the templates (which may be periodically updated and centrally audited) and customize the templates for evaluating the risk associated with the entities' respective business endeavors that involve the relevant vendors, products, or services.

23 Claims, 21 Drawing Sheets

Related U.S. Application Data

62/353,802, filed on Jun. 23, 2016, provisional application No. 62/348,695, filed on Jun. 10, 2016.

(56) References Cited

U.S. PATENT DOCUMENTS

| | | |
|---|---|---|
| 6,925,443 B1 | 8/2005 | Baggett, Jr. et al. |
| 7,234,065 B2 | 6/2007 | Breslin et al. |
| 7,251,624 B1 | 7/2007 | Lee et al. |
| 7,260,830 B2 | 8/2007 | Sugimoto |
| 7,287,280 B2 | 10/2007 | Young |
| 7,478,157 B2 | 1/2009 | Bohrer et al. |
| 7,603,356 B2 | 10/2009 | Schran et al. |
| 7,729,940 B2 | 6/2010 | Harvey et al. |
| 7,788,632 B2 | 8/2010 | Kuester et al. |
| 7,801,758 B2 | 9/2010 | Gracie et al. |
| 7,853,468 B2 | 12/2010 | Callahan et al. |
| 7,877,812 B2 | 1/2011 | Koved et al. |
| 7,885,841 B2 | 2/2011 | King |
| 7,966,663 B2 | 6/2011 | Strickland et al. |
| 7,991,559 B2 | 8/2011 | Dzekunov et al. |
| 8,019,881 B2 | 9/2011 | Sandhu et al. |
| 8,146,074 B2 | 3/2012 | Ito et al. |
| 8,156,158 B2 | 4/2012 | Rolls et al. |
| 8,176,334 B2 | 5/2012 | Vainstein |
| 8,504,481 B2 | 8/2013 | Motahari et al. |
| 8,578,036 B1 | 11/2013 | Holfelder et al. |
| 8,583,694 B2 | 11/2013 | Siegel et al. |
| 8,601,591 B2 | 12/2013 | Krishnamurthy et al. |
| 8,612,420 B2 | 12/2013 | Sun et al. |
| 8,612,993 B2 | 12/2013 | Grant et al. |
| 8,683,502 B2 | 3/2014 | Shkedi et al. |
| 8,712,813 B2 | 4/2014 | King |
| 8,805,707 B2 | 8/2014 | Schumann, Jr. et al. |
| 8,805,925 B2 | 8/2014 | Price et al. |
| 8,812,342 B2 | 8/2014 | Barcelo et al. |
| 8,819,253 B2 | 8/2014 | Simeloff et al. |
| 8,826,446 B1 | 9/2014 | Liu et al. |
| 8,914,299 B2 | 12/2014 | Pesci-Anderson et al. |
| 8,943,076 B2 | 1/2015 | Stewart et al. |
| 9,092,796 B2 | 7/2015 | Eversoll et al. |
| 9,094,434 B2 | 7/2015 | Williams et al. |
| 9,152,820 B1 | 10/2015 | Pauley, Jr. et al. |
| 9,158,655 B2 | 10/2015 | Wadhwani et al. |
| 9,172,706 B2 | 10/2015 | Krishnamurthy et al. |
| 9,202,085 B2 | 12/2015 | Mawdsley et al. |
| 9,215,252 B2 | 12/2015 | Smith et al. |
| 9,288,118 B1 | 3/2016 | Pattan |
| 9,338,188 B1 | 5/2016 | Ahn |
| 9,348,802 B2 | 5/2016 | Massand |
| 9,384,357 B2 | 7/2016 | Patil et al. |
| 9,401,900 B2 | 7/2016 | Levasseur et al. |
| 9,424,021 B2 | 8/2016 | Zamir |
| 9,477,660 B2 | 10/2016 | Scott et al. |
| 9,507,960 B2 | 11/2016 | Bell et al. |
| 9,521,166 B2 | 12/2016 | Wilson |
| 9,602,529 B2 | 3/2017 | Jones et al. |
| 9,646,095 B1 | 5/2017 | Gottlieb et al. |
| 9,652,314 B2 | 5/2017 | Mahiddini |
| 9,654,541 B1 | 5/2017 | Kapczynski et al. |
| 9,691,090 B1 | 6/2017 | Barday |
| 9,721,108 B2 | 8/2017 | Krishnamurthy et al. |
| 2002/0161594 A1 | 10/2002 | Bryan et al. |
| 2003/0041250 A1 | 2/2003 | Proudler |
| 2006/0075122 A1 | 4/2006 | Lindskog et al. |
| 2007/0027715 A1 | 2/2007 | Gropper et al. |
| 2007/0157311 A1 | 7/2007 | Meier et al. |
| 2007/0266420 A1 | 11/2007 | Hawkins et al. |
| 2007/0283171 A1 | 12/2007 | Breslin et al. |
| 2008/0028435 A1 | 1/2008 | Strickland et al. |
| 2009/0204452 A1 | 8/2009 | Iskandar et al. |
| 2010/0121773 A1 | 5/2010 | Currier et al. |
| 2010/0333012 A1 | 12/2010 | Adachi et al. |
| 2011/0010202 A1 | 1/2011 | Neale |
| 2012/0102543 A1 | 4/2012 | Kohli et al. |
| 2012/0116923 A1 | 5/2012 | Irving et al. |
| 2012/0259752 A1 | 10/2012 | Agee |
| 2013/0218829 A1 | 8/2013 | Martinez |
| 2013/0311224 A1 | 11/2013 | Heroux et al. |
| 2013/0332362 A1 | 12/2013 | Ciurea |
| 2013/0340086 A1 | 12/2013 | Blom |
| 2014/0006616 A1 | 1/2014 | Aad et al. |
| 2014/0012833 A1 | 1/2014 | Humprecht |
| 2014/0032265 A1 | 1/2014 | Paprocki |
| 2014/0040134 A1 | 2/2014 | Ciurea |
| 2014/0047551 A1 | 2/2014 | Nagasundaram et al. |
| 2014/0089039 A1 | 3/2014 | McClellan |
| 2014/0208418 A1 | 7/2014 | Libin |
| 2014/0278663 A1 | 9/2014 | Samuel et al. |
| 2014/0283027 A1 | 9/2014 | Orona et al. |
| 2014/0337466 A1 | 11/2014 | Li et al. |
| 2015/0066577 A1 | 3/2015 | Christiansen et al. |
| 2015/0106948 A1 | 4/2015 | Holman et al. |
| 2015/0106949 A1 | 4/2015 | Holman et al. |
| 2015/0169318 A1 | 6/2015 | Nash |
| 2015/0229664 A1 | 8/2015 | Hawthorn et al. |
| 2015/0242778 A1 | 8/2015 | Wilcox et al. |
| 2015/0269384 A1 | 9/2015 | Holman et al. |
| 2015/0356362 A1 | 12/2015 | Demos |
| 2016/0048700 A1 | 2/2016 | Stransky-Heilkron |
| 2016/0099963 A1 | 4/2016 | Mahaffey et al. |
| 2016/0162269 A1 | 6/2016 | Pogorelik et al. |
| 2016/0234319 A1 | 8/2016 | Griffin |
| 2016/0321748 A1 | 11/2016 | Mahatma et al. |
| 2016/0364736 A1 | 12/2016 | Maugans, III |
| 2017/0142158 A1 | 5/2017 | Laoutaris et al. |
| 2017/0161520 A1 | 6/2017 | Lockhart, III et al. |
| 2017/0177324 A1 | 6/2017 | Frank et al. |
| 2017/0193624 A1 | 7/2017 | Tsai |
| 2017/0206707 A1 | 7/2017 | Guay et al. |
| 2017/0270318 A1* | 9/2017 | Ritchie ............... G06Q 40/025 |
| 2017/0330197 A1* | 11/2017 | DiMaggio ............ G06Q 30/018 |

OTHER PUBLICATIONS

Written Opinion of the International Searching Authority, dated Jun. 21, 2017, from corresponding International Application No. PCT/US2017/025600.

Office Action, dated Dec. 15, 2016, from corresponding U.S. Appl. No. 15/256,419.

Restriction Requirement, dated Jan. 18, 2017, from corresponding U.S. Appl. No. 15/256,430.

Restriction Requirement, dated Nov. 21, 2016, from corresponding U.S. Appl. No. 15/254,901.

TRUSTe Announces General Availability of Assessment Manager for Enterprises to Streamline Data Privacy Management with Automation, PRNewswire, Mar. 4, 2015.

www.truste.com (1), 200150207, Internet Archive Wayback Machine, www.archive.org,2_7_2015.

Notice of Allowance, dated Apr. 12, 2017, from corresponding U.S. Appl. No. 15/256,419.

Notice of Allowance, dated May 5, 2017, from corresponding U.S. Appl. No. 15/254,901.

International Search Report, dated Jun. 6, 2017, from corresponding International Application No. PCT/US2017/025605.

International Search Report, dated Jun. 6, 2017, from corresponding International Application No. PCT/US2017/025611.

Written Opinion of the International Searching Authority, dated Jun. 6, 2017, from corresponding International Application No. PCT/US2017/025611.

Written Opinion of the International Searching Authority, dated Jun. 6, 2017, from corresponding International Application No. PCT/US2017/025605.

Office Action, dated Jul. 21, 2017, from corresponding U.S. Appl. No. 15/256,430.

Restriction Requirement, dated Jul. 28, 2017, from corresponding U.S. Appl. No. 15/169,658.

International Search Report, dated Aug. 8, 2017, from corresponding International Application No. PCT/US2017/036889.

Written Opinion of the International Searching Authority, dated Aug. 8, 2017, from corresponding International Application No. PCT/US2017/036889.

(56) References Cited

OTHER PUBLICATIONS

International Search Report, dated Aug. 8, 2017, from corresponding International Application No. PCT/US2017/036890.
Written Opinion of the International Searching Authority, dated Aug. 8, 2017, from corresponding International Application No. PCT/US2017/036890.
International Search Report, dated Aug. 8, 2017, from corresponding International Application No. PCT/US2017/036893.
Written Opinion of the International Searching Authority, dated Aug. 8, 2017, from corresponding International Application No. PCT/US2017/036893.
Ghiglieri, Marco et al.; Personal DLP for Facebook, 2014 IEEE International Conference on Pervasive Computing and Communication Workshops (Percom Workshops); IEEE; Mar. 24, 2014; pp. 629-634.
Korba, Larry et al.; "Private Data Discovery for Privacy Compliance in Collaborative Environments"; Cooperative Design, Visualization, and Engineering; Springer Berlin Heidelberg; Sep. 21, 2008; pp. 142-150.
SYMANTEC, Symantex Data Loss Prevention—Discover, monitor, and protect confidential data; 2008; Symantec Corporation; http://www.mssuk.com/images/Symantec%2014552315_IRC_BR_DLP_03.09_sngl.pdf.
Invitation to Pay Additional Search Fees, dated Aug. 10, 2017, from corresponding International Application No. PCT/US2017/036912.
Invitation to Pay Additional Search Fees, dated Aug. 10, 2017, from corresponding International Application No. PCT/US2017/036917.
International Search Report, dated Aug. 8, 2017, from corresponding International Application No. PCT/US2017/036913.
Written Opinion of the International Searching Authority, dated Aug. 8, 2017, from corresponding International Application No. PCT/US2017/036913.
International Search Report, dated Aug. 8, 2017, from corresponding International Application No. PCT/US2017/036901.
Written Opinion of the International Searching Authority, dated Aug. 8, 2017, from corresponding International Application No. PCT/US2017/036901.
International Search Report, dated Aug. 15, 2017, from corresponding International Application No. PCT/US2017/036919.
Written Opinion of the International Searching Authority, dated Aug. 15, 2017, from corresponding International Application No. PCT/US2017/036919.
International Search Report, dated Aug. 8, 2017, from corresponding International Application No. PCT/US2017/036920.
Written Opinion of the International Searching Authority, dated Aug. 8, 2017, from corresponding International Application No. PCT/US2017/036920.
Notice of Allowance, dated Aug. 18, 2017, from corresponding U.S. Appl. No. 15/619,455.
Office Action, dated Aug. 23, 2017, from corresponding U.S. Appl. No. 15/626,052.
Office Action, dated Aug. 24, 2017, from corresponding U.S. Appl. No. 15/619,451.
Office Action, dated Aug. 24, 2017, from corresponding U.S. Appl. No. 15/169,643.
International Search Report, dated Aug. 21, 2017, from corresponding International Application No. PCT/US2017/036914.
Written Opinion of the International Searching Authority, dated Aug. 21, 2017, from corresponding International Application No. PCT/US2017/036914.
Invitation to Pay Additional Search Fees, dated Aug. 24, 2017, from corresponding International Application No. PCT/US2017/036888.
Office Action, dated Aug. 29, 2017, from corresponding U.S. Appl. No. 15/619,237.
Office Action, dated Aug. 30, 2017, from corresponding U.S. Appl. No. 15/619,382.
Office Action, dated Sep. 1, 2017, from corresponding U.S. Appl. No. 15/619,459.
Office Action, dated Sep. 7, 2017, from corresponding U.S. Appl. No. 15/633,703.
Office Action, dated Sep. 6, 2017, from corresponding U.S. Appl. No. 15/619,479.
Office Action, dated Sep. 5, 2017, from corresponding U.S. Appl. No. 15/619,469.
International Search Report, dated Sep. 1, 2017, from corresponding International Application No. PCT/US2017/036896.
Written Opinion of the International Searching Authority, dated Sep. 1, 2017, from corresponding International Application No. PCT/US2017/036896.
International Search Report, dated Aug. 29, 2017, from corresponding International Application No. PCT/US2017/036898.
Written Opinion of the International Searching Authority, dated Aug. 29, 2017, from corresponding International Application No. PCT/US2017/036898.
Office Action, dated Sep. 8, 2017, from corresponding U.S. Appl. No. 15/619,251.
Office Action, dated Sep. 11, 2017, from corresponding U.S. Appl. No. 15/619,375.
Office Action, dated Sep. 11, 2017, from corresponding U.S. Appl. No. 15/619,478.
Office Action, dated Sep. 19, 2017, from corresponding U.S. Appl. No. 15/671,073.
Office Action, dated Sep. 22, 2017, from corresponding U.S. Appl. No. 15/619,278.
Notice of Allowance, dated Sep. 27, 2017, from corresponding U.S. Appl. No. 15/626,052.
International Search Report, dated Oct. 3, 2017, from corresponding International Application No. PCT/US2017/036912.
Written Opinion of the International Searching Authority, dated Oct. 3, 2017, from corresponding International Application No. PCT/US2017/036912.
International Search Report, dated Oct. 12, 2017, from corresponding International Application No. PCT/US2017/036888.
Written Opinion of the International Searching Authority, dated Oct. 12, 2017, from corresponding International Application No. PCT/US2017/036888.
International Search Report, dated Oct. 20, 2017, from corresponding International Application No. PCT/US2017/036917.
Written Opinion of the International Searching Authority, dated Oct. 20, 2017, from corresponding International Application No. PCT/US2017/036917.
Office Action, dated Nov. 1, 2017, from corresponding U.S. Appl. No. 15/169,658.
Notice of Allowance, dated Nov. 7, 2017, from corresponding U.S. Appl. No. 15/671,073.
Final Office Action, dated Nov. 29, 2017, from corresponding U.S. Appl. No. 15/619,237.
Notice of Allowance, dated Dec. 6, 2017, from corresponding U.S. Appl. No. 15/619,451.
Notice of Allowance, dated Dec. 5, 2017, from corresponding U.S. Appl. No. 15/633,703.
Notice of Allowance, dated Dec. 6, 2017, from corresponding U.S. Appl. No. 15/619,459.
Notice of Allowance, dated Dec. 12, 2017, from corresponding U.S. Appl. No. 15/619,382.
Notice of Allowance, dated Dec. 12, 2017, from corresponding U.S. Appl. No. 15/169,643.

\* cited by examiner

Add Data Flow

① Description ② What is collected? ③ From Who? ④ Where is it stored? ⑤ Who has access?

| | |
|---|---|
| Short Summary (name) | [Internet Usage History] — 1005 |
| | *This is a required field.* |
| | Summary name of this data flow that will help identify this flow when referencing it. For example "Email newsletter signup flow." |
| Description | Data flow involved with tracking internet usage for subscribers in order for us to bill for overages, manage quotas, and run analytics. — 1010 |
| | 79 characters left |
| Business Group | [Internet x] 1040a — 815 |
| Primary Business Rep | [Me] [Someone Else] John Doe (jdoe@acme.ca) — 1020, 1040b |
| Privacy Office Rep | [Me] [Someone Else] — 1025, 1040c |
| Tags | [POC x] — 1030 |
| Due Date | 📅 February 13th, 2016 — 1035 |
| Reminders | [On] [Off] |

[Save & Continue] ◁ 1 2 3 4 5 6 7 8 9 ▷ ▷▷ [Assign & Close] [Cancel]

Item 1-20 of 153     Page Size [20]

Privacy Management Portal

Personal Information Inventory — 1700

Filters — 1745

- ▷ Risk
- ▷ Status
- ▷ Source
- ▷ Destination
- ▷ Transfers
- ▷ Audit — 1750
- ▽ Collection Purpose
  - ☑ Commercial Relations
  - ☐ Understand Needs
  - ☐ Provide Products/Services
  - ☑ Develop Business & Ops
  - ☑ Legal Requirement
- ▷ Personal Data
- ▷ Security at Rest
- ▷ Security in Transit
- ▷ Retention
- ▷ Last Update
- ▷ Business Unit
- ▷ Department
- ▷ Consent Type
- ▷ Minors ⊕ ADD DATA FLOW — 1740 | Data Flow Summary — 1755 | ▼ More | Search list — 1730 🔍 — 1735

| | Risk ▼ | 1760 — Data Flow Summary | Status — 1710 | Source — 1720 | Destination | Access | Audit |
|---|---|---|---|---|---|---|---|
| ☐ | ✎ | Internet Usage History | Pending Review | Customers | Acme DC | 4 Transfers | ? Pending |
| ☐ | ✎ | Customer Payment Info | Approved | Customers | Savvis | 8 Transfers | ✓ 140 days |
| ☐ | ✎ | Call History Log | Audit Needed | Customers | ROOT | 3 Transfers | ⊗ Expired |
| ☐ | ✎ | Cellular Roaming Records | Approved | Customers | Savvis | 3 Transfers | ✓ 360 days |
| ☐ | ✎ | New Service Installation | Approved | Customers | Acme DC | 9 Transfers | ✓ 205 days |
| ☐ | ✎ | Collections Records | Approved | Customers | Acme DC | 6 Transfers | ✓ 180 days |
| ☐ | ✎ | Giveaways Signup | Pending Review | Customers | Zendesk | 3 Transfers | ? Pending |
| ☐ | ✎ | Customer Billing Records | Approved | Customers | Acme DC | 2 Transfers | ✓ OK |
| ☐ | ✎ | Services Subscriptions | Approved | Customers | Acme DC | 2 Transfers | ⊗ 3 days |
| ☐ | ✎ | Complaint History Records | Action Required | Customers | Zendesk | 2 Transfers | ✓ OK |
| ☐ | ✎ | Customer Credit Records | Approved | Customers | Acme DC | 6 Transfers | ✓ OK |
| ☐ | ▷ | Customer Support/Chat Session | Approved | Customers | Zendesk | 3 Transfers | ✓ OK |
| ☐ | ▷ | Employee Reference Checks | Approved | Employees | Savvis | 7 Transfers | ✓ OK |

≪ ◁ 1 2 3 4 5 6 7 8 9 ▷ ≫  Item 1-20 of 153        Page Size 20

FIG. 17

DATA PROCESSING SYSTEMS AND METHODS FOR EFFICIENTLY ASSESSING THE RISK OF PRIVACY CAMPAIGNS

CROSS-REFERENCE TO RELATED APPLICATIONS

This application is a continuation-in-part of U.S. patent application Ser. No. 15/256,419, filed Sep. 2, 2016, which is a continuation of U.S. patent application Ser. No. 15/169,643, filed May 31, 2016, which claims priority to U.S. Provisional Patent Application Ser. No. 62/317,457, filed Apr. 1, 2016, and this application also claims priority to U.S. Provisional Patent Application Ser. No. 62/360,123, filed Jul. 8, 2016; U.S. Provisional Patent Application Ser. No. 62/353,802, filed Jun. 23, 2016; and U.S. Provisional Patent Application Ser. No. 62/348,695, filed Jun. 10, 2016, the disclosures of which are hereby incorporated by reference in their entirety.

TECHNICAL FIELD

Various embodiments of this disclosure relate to specific computerized data processing systems and methods for use in generating, in an efficient manner, risk assessments associated with particular privacy campaigns.

BACKGROUND

Over the past years, privacy and security policies, and related operations have become increasingly important. Breaches in security, leading to the unauthorized access of personal data (which may include sensitive personal data) have become more frequent among companies and other organizations of all sizes. Such personal data may include, but is not limited to, personally identifiable information (PII), which may be information that directly (or indirectly) identifies an individual or entity. Examples of PII include names, addresses, dates of birth, social security numbers, and biometric identifiers such as a person's fingerprints or picture. Other personal data may include, for example, customers' Internet browsing habits, purchase history, or even their preferences (i.e., likes and dislikes, as provided or obtained through social media). While not all personal data may be sensitive, in the wrong hands, this kind of information may have a negative impact on the individuals or entities whose sensitive personal data is collected, including identity theft and embarrassment. Not only would this breach have the potential of exposing individuals to malicious wrongdoing, the fallout from such breaches may result in damage to reputation, potential liability, and costly remedial action for the organizations that collected the information and that were under an obligation to maintain its confidentiality and security. These breaches may result in not only financial loss, but loss of credibility, confidence, and trust from individuals, stakeholders, and the public.

Many organizations that obtain, use, and transfer personal data, including sensitive personal data, have begun to address these privacy and security issues. To manage personal data, many companies have attempted to implement operational policies and processes that comply with legal requirements, such as Canada's Personal Information Protection and Electronic Documents Act (PIPEDA) or the U.S.'s Health Insurance Portability and Accountability Act (HIPPA) protecting a patient's medical information. The European Union's General Data Protection Regulation (GDPR) can fine companies up to 4% of their global worldwide turnover (revenue) for not complying with its regulations (companies must comply by March 2018). These operational policies and processes also strive to comply with industry best practices (e.g., the Digital Advertising Alliance's Self-Regulatory Principles for Online Behavioral Advertising). Many regulators recommend conducting privacy impact assessments, or data protection risk assessments along with data inventory mapping. For example, the GDPR requires data protection impact assessments. Additionally, the United Kingdom ICO's office provides guidance around privacy impact assessments. The OPC in Canada recommends personal information inventory, and the Singapore PDPA specifically mentions personal data inventory mapping.

Thus, developing operational policies and processes may reassure not only regulators, but also an organization's customers, vendors, and other business partners.

For many companies handling personal data, privacy audits, whether done according to AICPA Generally Accepted Privacy Principles, or ISACA's IT Standards, Guidelines, and Tools and Techniques for Audit Assurance and Control Professionals, are not just a best practice, they are a requirement (for example, Facebook and Google will be required to perform ten privacy audits each until 2032 to ensure that their treatment of personal data comports with the expectations of the Federal Trade Commission). When the time comes to perform a privacy audit, be it a compliance audit or adequacy audit, the lack of transparency or clarity into where personal data comes from, where is it stored, who is using it, where it has been transferred, and for what purpose is it being used, may bog down any privacy audit process. Even worse, after a breach occurs and is discovered, many organizations are unable to even identify a clear-cut organizational owner responsible for the breach recovery, or provide sufficient evidence that privacy policies and regulations were complied with.

Additionally, third-party vendors that provide software applications and systems that handle or access the personal data of others may provide such software to large numbers of different customers (e.g., hundreds or thousands of different customers). This adds an additional level of complexity because when a customer of the vendor is performing a privacy audit, the privacy audit may involve evaluating the vendor's compliance with one or more of the company's specific privacy policies, which may, for example, have been derived from one or more assessment standards. As part of this evaluation process, the customer may direct numerous questions to the vendor that only the vendor is in a position to answer, either initially, or periodically. If the vendor has, for example, thousands of customers, the result is that the vendor may be pressed to field questions from each of its customers every time that the customer evaluates the vendor for compliance. This can lead to a situation in which both the vendor and its customers experience delays. This may also be the case in situations where a vendor handles personal data when providing services, or products other than software.

In light of the above, there is currently a need for improved systems and methods for monitoring compliance with corporate privacy policies and applicable privacy laws.

SUMMARY

According to exemplary embodiments, a system and method are provided to facilitate the assessment of one or more vendors' compliance with one or more privacy assessment standards (e.g., privacy laws, privacy standards); and allow the vendors' customers (e.g., companies or organizations who do business with the vendors, such as those who use a particular vendor's products (e.g., software, hardware) and/or services to create, view, and/or apply customized criteria to, information periodically collected by the system to evaluate each vendor's compliance with one or more of the company's specific privacy policies.

The system may be comprised of one or more servers and/or client computing devices that execute one or more software modules that perform functions and methods described below. According to exemplary embodiments, a privacy campaign can be created using the system. A privacy campaign may be, for example a business function, system, product, technology, process, project, engagement, initiative, campaign, etc., that may utilize personal data collected from one or more persons or entities.

In various embodiments, the system presents, on one or more graphical user interfaces, a plurality of prompts for the input of campaign data related to the privacy campaign. The system then electronically receives any campaign data input by one or more users in response to the prompts. The system may be operable to facilitate the entry of campaign data representative of one or more attributes related to the personal data collected as part of the campaign. The system may also be operable to electronically calculate a risk level for the privacy campaign based on the received campaign data.

According to exemplary embodiments, a system is provided for storing and distributing templates that include questions regarding the use of personal data, and corresponding, respective answers to those questions. The system may digitally store a plurality of templates in memory as sets of digital data in an electronic repository. Each of these templates may relate, for example, to a product (e.g., specific software) provided by a vendor, or to a vendor's business practices as they provide products or services to their customers.

In particular embodiments, the questions and answers may have been audited (e.g., by a third-party compliance assessor) to determine whether the vendor and/or the vendor's products and/or services comply with one or more privacy policies and/or privacy standards. For example, the questions and answers for a particular vendor may have been centrally audited by a third-party compliance assessor to determine whether software (or other product or service) provided by the vendor complies with one or more privacy standards, such as, for example, ISO27001, NIST, SOC I, SOC Type II.

In various embodiments, a graphical user interface (e.g., a central community portal) displays one or more templates as one or more visual representations of information. A subset of the templates may be displayed, for example, in response to a command by the customer to display the templates based, for example, on a particular classification of the product or service that is the subject of the template (e.g., CRM software, Marketing software, HR software, etc.). In various embodiments, a customer may acquire rights to use one or more of the templates by selecting a displayed template. After selection, the system may electronically make the template available for access to the customer, for example, by associating the template with an account of the customer. The system may also allow the customer to view the templates associated with the customer's account.

In various embodiments, the system is adapted to allow a user to choose whether to associate one or more completed templates with a particular privacy campaign so that the completed templates are included in any audit and/or assessment of the privacy campaign. The system may be adapted to calculate a risk value for each question/answer pairing within the template and also to assign a default weighting value to that question/answer pairing. In various embodiments, the system may be adapted to allow a user to assign (e.g., by electronic entry) a relative risk rating to each question/answer pairing, and/or a weighting factor for each question/answer pairing that the customer chooses to associate with the privacy campaign. In particular embodiments, the system may also calculate an aggregated risk score for the privacy campaign and associate the aggregated risk score with the privacy campaign.

In addition, in particular embodiments, the system is adapted to allow the user to selectively filter the questions and corresponding answers to be included in the assessment of a particular campaign based on the respective assessment standards to which the questions and answers relate. For example, the system may allow a user to indicate that they only wish to include only question/answer pairings that are included in the template and that are part of a particular privacy standard (e.g., ISO27001, NIST, SOC I, or SOC Type II).

Having accounted for the audit results provided by the vendor, the system may further allow a customer to include, for privacy audits and assessments, questions and answers related to the customer's particular use of the vendor's products or services (e.g., particular implementation of the vendor's software). These are typically questions and answers that are specific to the customer and that may not be possible for the vendor to answer. The system may also allow the customer to assign a relative risk rating and weighting factor to one or more of these custom question/answer pairings regarding the customer's implementation.

The system may later use the relative risk rating and weight factors for the question/answer pairings from any templates associated with a particular campaign and any custom questions to calculate an aggregated risk level for the vendor, product, or service that is the subject of the template. This may be used in calculating an aggregated risk level for the privacy campaign. The system may then display an inventory page that includes a plurality of campaigns and visual indicators that relate to the risk level for each campaign. Such visual indicators may respectively reflect the risk level of the various vendors, services or products (e.g., software) associated with each campaign.

In various embodiments, the system may also be adapted to automatically update the completed templates over time. In such embodiments, the system provides one or more users with access to, for example: (1) add or delete one or more questions to a particular template; or (2) change one or more answers to one or more questions included in the template. In various embodiments, the system may then, in response to receiving this update, distribute the updated completed templates to any users, and/or implementations of the systems that are configured to receive automatic updates to the template. This functionality may be useful, for example, in situations where particular products and services change over the course of time.

In particular embodiments, the system receives a selection by a customer to receive updates to a particular completed template and digitally stores the selection by the customer to receive updates. The system then determines whether an update of the completed template has occurred. Using the stored selection by the customer, the system electronically determines whether the customer selected to receive an updated completed template if an update to a completed template has occurred. If the customer selected to receive an updated completed template, the system associates an updated completed template with the account of the customer. The system also informs the customer that the completed template has been updated. The system may store, e.g., in an appropriate archive, the non-updated completed template. If the system determines that a customer did not elect to receive updates, the system may inform the customer that an update to the completed template is available and provide the user with the option to receive an electronic copy of the updated completed template.

In various embodiments, the system may be adapted to facilitate the updating of one or more templates submitted by a vendor according to a particular schedule, and/or in response to the occurrence of one or more particular events. In one such embodiment, after one or more completed templates are digitally stored in an electronic repository, the system may be operable to automatically determine whether an update to any of the completed templates is overdue (e.g., whether a particular time period has elapsed since the most recent update of the completed template, or whether one or more events have occurred that would require the template to be updated). In particular embodiments, if the system determines that an update is overdue, and if the update has not occurred, the system responds by taking a remedial measure, such as prompting a vendor associated with the template to update the template.

BRIEF DESCRIPTION OF THE DRAWINGS

Various embodiments of a system and method for operationalizing privacy compliance and assessing risk of privacy campaigns are described below. In the course of this description, reference will be made to the accompanying drawings, which are not necessarily drawn to scale, and wherein:

FIG. 10 is an example of a graphical user interface (GUI) showing a dialog that allows for entry of description information related to a privacy campaign.

FIG. 11 is an example of a notification, generated by the system, informing a business representative (e.g., owner) that they have been assigned to a particular privacy campaign.

FIG. 12 is an example of a GUI showing a dialog that allows entry of the type of personal data that is being collected for a campaign.

FIG. 14 is an example of a GUI that shows a dialog for inputting information regarding where the personal data related to a campaign is stored.

FIG. 15 is an example of a GUI that shows information regarding the access of the personal data related to a campaign.

FIG. 16 is an example of an instant messaging session overlaid on top of a GUI, wherein the GUI contains prompts for the entry or selection of campaign data.

FIG. 17 is an example of a GUI showing an inventory page.

Like reference numbers and designations in the various drawings indicate like elements.

DETAILED DESCRIPTION

Figure 1:
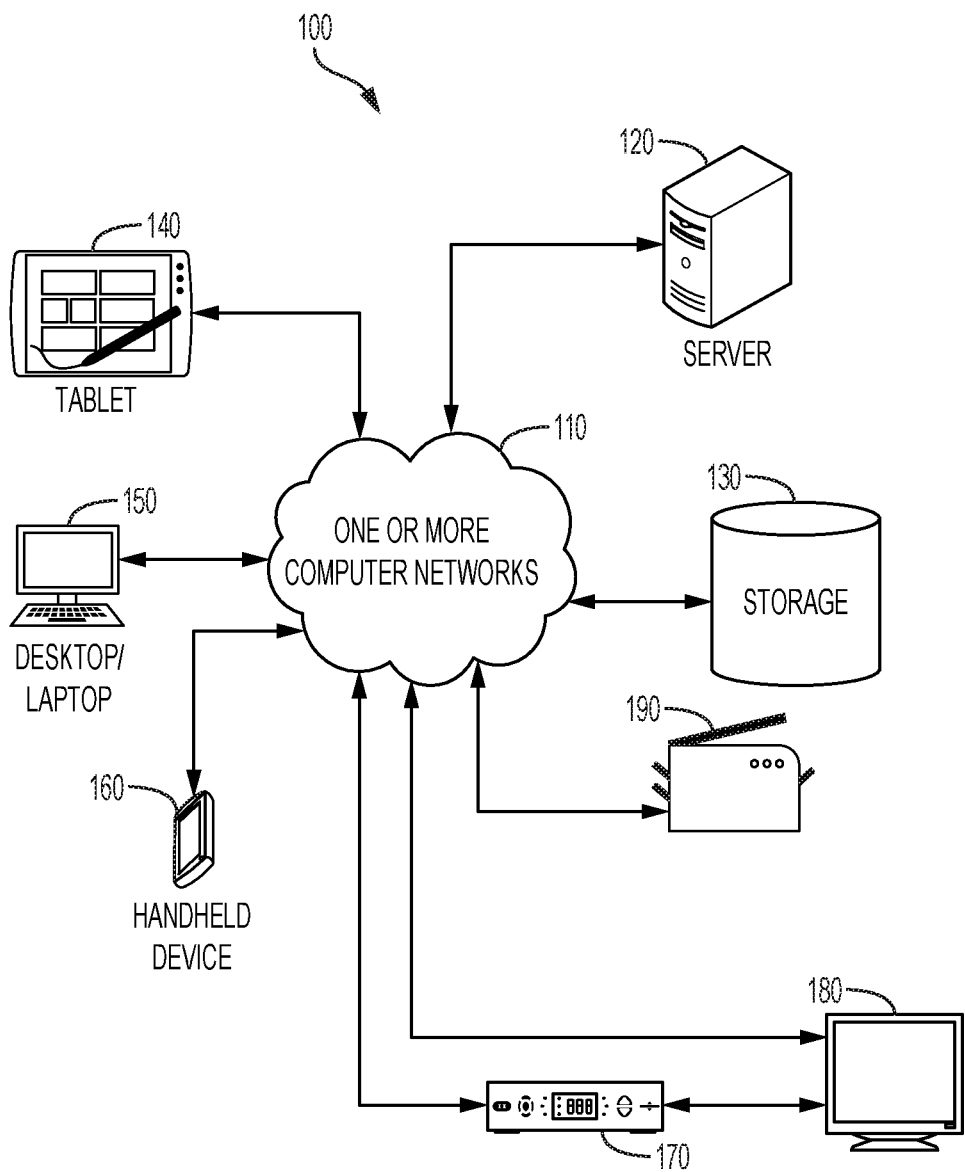
FIG. 1 is diagram illustrating an exemplary network environment in which the present system and methods for operationalizing privacy compliance may operate.

Various embodiments now will be described more fully hereinafter with reference to the accompanying drawings. It should be understood that the invention may be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Overview

According to exemplary embodiments, a system for operationalizing privacy compliance is described herein. The system may be comprised of one or more servers and client computing devices that execute software modules that facilitate various functions.

A Main Privacy Compliance Module is operable to allow a user to initiate the creation of a privacy campaign (i.e., a business function, system, product, technology, process, project, engagement, initiative, campaign, etc., that may utilize personal data collected from one or more persons or entities). The personal data may contain PII that may be sensitive personal data. The user can input information such as the name and description of the campaign. The user may also select whether he/she will take ownership of the campaign (i.e., be responsible for providing the information needed to create the campaign and oversee the conducting of privacy audits related to the campaign), or assign the campaign to one or more other persons. The Main Privacy Compliance Module can generate a sequence or serious of GUI windows that facilitate the entry of campaign data representative of attributes related to the privacy campaign (e.g., attributes that might relate to the description of the personal data, what personal data is collected, whom the data is collected from, the storage of the data, and access to that data).

Based on the information input, a Risk Assessment Module may be operable to take into account Weighting Factors and Relative Risk Ratings associated with the campaign in order to calculate a numerical Risk Level associated with the campaign, as well as an Overall Risk Assessment for the campaign (i.e., low-risk, medium risk, or high risk). The Risk Level may be indicative of the likelihood of a breach involving personal data related to the campaign being compromised (i.e., lost, stolen, accessed without authorization, inadvertently disclosed, maliciously disclosed, etc.). An inventory page can visually depict the Risk Level for one or more privacy campaigns.

After the Risk Assessment Module has determined a Risk Level for a campaign, a Privacy Audit Module may be operable to use the Risk Level to determine an audit schedule for the campaign. The audit schedule may be editable, and the Privacy Audit Module also facilitates the privacy audit process by sending alerts when a privacy audit is impending, or sending alerts when a privacy audit is overdue.

The system additionally provides for a Template Storage and Distribution Module for storing templates (e.g., completed or uncompleted templates) accessible via a community portal. In particular embodiments, an uncompleted template may be a template of questions that have not yet been answered. Similarly, a completed template may be a template of questions and corresponding answers. The Template Storage and Distribution Module additionally allows a customer to associate customer-selected templates (e.g., completed or uncompleted templates) with the customer's account.

The system also provides for an Audit Results and Customer Implementation Module that allows a user to associate a template related to a vendor's products and/or services (e.g., a vendor's software) with a privacy campaign related to the vendor's products and/or services. The module also enables the system to present a customer with questions regarding the customer's implementation of a vendor-provided software. Additionally, the module enables a customer to enter or assign relative risk levels and weight factors for both audit results and questions and answers related to the customer's implementation.

A Template Update Module facilitates the updating of templates by a vendor and the distribution of updated templates to customers that subscribe to the template updates. The Template Update Module may also determine whether an update to a particular vendor template is overdue, and may take remedial measures if a template update is overdue.

The system also provides for a Communications Module that facilitates the creation and transmission of notifications and alerts (e.g., via email). The Communications Module may also instantiate an instant messaging session and overlay the instant messaging session over one or more portions of a GUI in which a user is presented with prompts to enter or select information.

Exemplary Technical Platforms

As will be appreciated by one skilled in the relevant field, a system for operationalizing privacy compliance and assessing risk of privacy campaigns may be, for example, embodied as a computer system, a method, or a computer program product. Accordingly, various embodiments may take the form of an entirely hardware embodiment, an entirely software embodiment, or an embodiment combining software and hardware aspects. Furthermore, particular embodiments may take the form of a computer program product stored on a computer-readable storage medium having computer-readable instructions (e.g., software) embodied in the storage medium. Various embodiments may take the form of web, mobile, wearable computer-implemented, computer software. Any suitable computer-readable storage medium may be utilized including, for example, hard disks, compact disks, DVDs, optical storage devices, and/or magnetic storage devices.

Various embodiments are described below with reference to block diagrams and flowchart illustrations of methods, apparatuses (e.g., systems) and computer program products. It should be understood that each step of the block diagrams and flowchart illustrations, and combinations of steps in the block diagrams and flowchart illustrations, respectively, may be implemented by a computer executing computer program instructions. These computer program instructions may be loaded onto a general purpose computer, special purpose computer, or other programmable data processing apparatus to produce a machine, such that the instructions which execute on the computer or other programmable data processing apparatus to create means for implementing the functions specified in the flowchart step or steps These computer program instructions may also be stored in a computer-readable memory that may direct a computer or other programmable data processing apparatus to function in a particular manner such that the instructions stored in the computer-readable memory produce an article of manufacture that is configured for implementing the function specified in the flowchart step or steps. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart step or steps.

Accordingly, steps of the block diagrams and flowchart illustrations support combinations of mechanisms for performing the specified functions, combinations of steps for performing the specified functions, and program instructions for performing the specified functions. It should also be understood that each step of the block diagrams and flowchart illustrations, and combinations of steps in the block diagrams and flowchart illustrations, may be implemented by special purpose hardware-based computer systems that perform the specified functions or steps, or combinations of special purpose hardware and other hardware executing appropriate computer instructions.

Example System Architecture

FIG. 1 is a block diagram of a System 100 according to a particular embodiment. As may be understood from this figure, the System 100 includes one or more computer networks 110, a Server 120, a Storage Device 130 (which may contain one or more databases of information), one or more remote client computing devices such as a tablet computer 140, a desktop or laptop computer 150, or a handheld computing device 160, such as a cellular phone, browser and Internet capable set-top boxes 170 connected with a TV 180, or even smart TVs 180 having browser and Internet capability. The client computing devices attached to the network may also include copiers/printers 190 having hard drives (a security risk since copies/prints may be stored on these hard drives). The Server 120, client computing devices, and Storage Device 130 may be physically located in a central location, such as the headquarters of the organization, for example, or in separate facilities. The devices may be owned or maintained by employees, contractors, or other third parties (e.g., a cloud service provider). In particular embodiments, the one or more computer networks 115 facilitate communication between the Server 120, one or more client computing devices 140, 150, 160, 170, 180, 190, and Storage Device 130.

The one or more computer networks 115 may include any of a variety of types of wired or wireless computer networks such as the Internet, a private intranet, a public switched telephone network (PSTN), or any other type of network. The communication link between the Server 120, one or more client computing devices 140, 150, 160, 170, 180, 190, and Storage Device 130 may be, for example, implemented via a Local Area Network (LAN) or via the Internet.

Example Computer Architecture Used within the System

Figure 2:
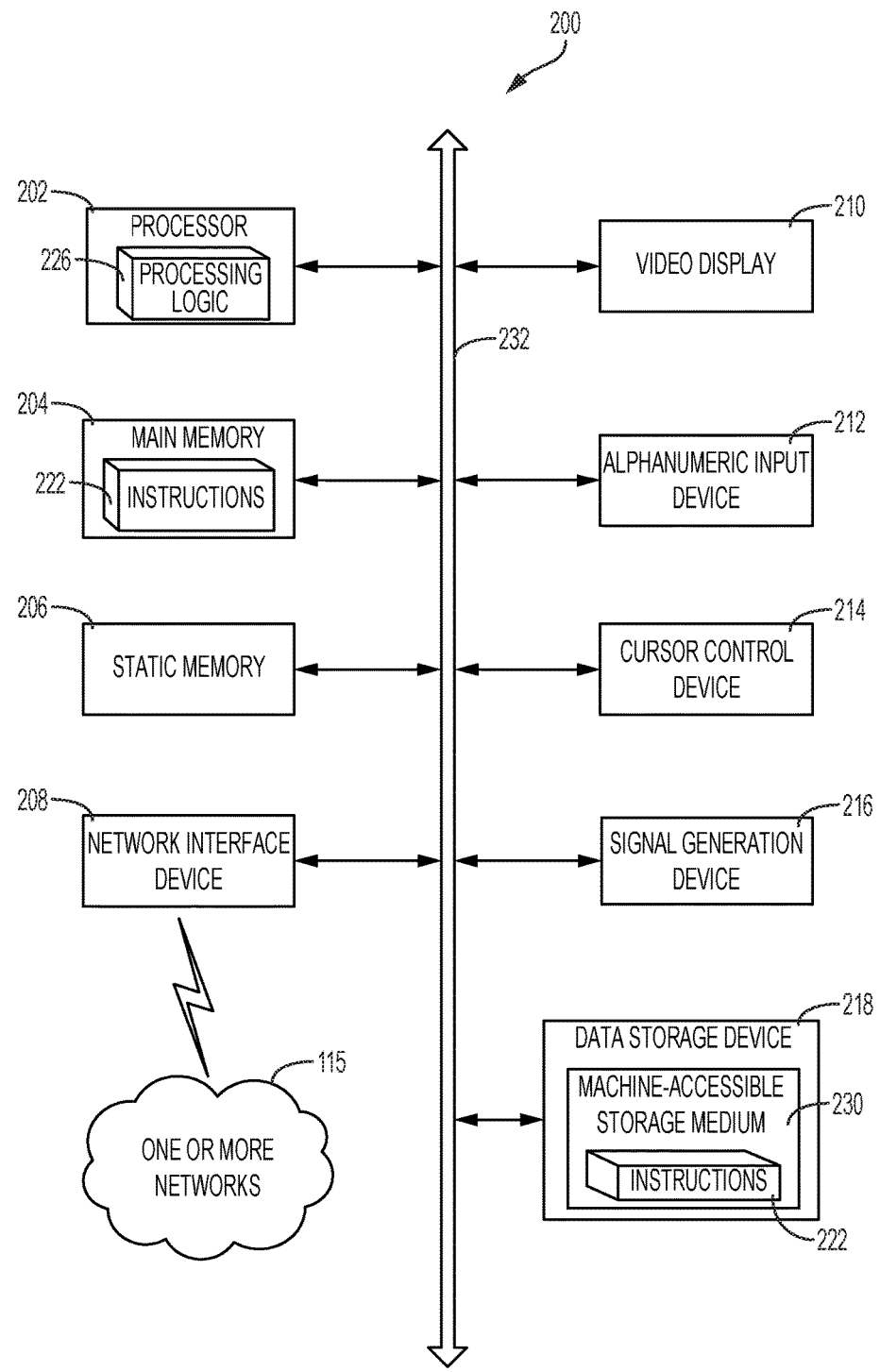
FIG. 2 is a schematic diagram of a computer (such as the server 120, or user device 140, 150, 160, 170, 180, 190) that is suitable for use in various embodiments.

FIG. 2 illustrates a diagrammatic representation of the architecture of a computer 200 that may be used within the System 100, for example, as a client computer (e.g., one of computing devices 140, 150, 160, 170, 180, 190, shown in FIG. 1), or as a server computer (e.g., Server 120 shown in FIG. 1). In exemplary embodiments, the computer 200 may be suitable for use as a computer within the context of the System 100 that is configured to operationalize privacy compliance and assess risk of privacy campaigns. In particular embodiments, the computer 200 may be connected (e.g., networked) to other computers in a LAN, an intranet, an extranet, and/or the Internet. As noted above, the computer 200 may operate in the capacity of a server or a client computer in a client-server network environment, or as a peer computer in a peer-to-peer (or distributed) network environment. The computer 200 may be a personal computer (PC), a tablet PC, a set-top box (STB), a Personal Digital Assistant (PDA), a cellular telephone, a web appliance, a server, a network router, a switch or bridge, or any other computer capable of executing a set of instructions (sequential or otherwise) that specify actions to be taken by that computer. Further, while only a single computer is illustrated, the term "computer" shall also be taken to include any collection of computers that individually or jointly execute a set (or multiple sets) of instructions to perform any one or more of the methodologies discussed herein.

An exemplary computer 200 includes a processing device 202, a main memory 204 (e.g., read-only memory (ROM), flash memory, dynamic random access memory (DRAM) such as synchronous DRAM (SDRAM) or Rambus DRAM (RDRAM), etc.), a static memory 206 (e.g., flash memory, static random access memory (SRAM), etc.), and a data storage device 218, which communicate with each other via a bus 232.

The processing device 202 represents one or more general-purpose processing devices such as a microprocessor, a central processing unit, or the like. More particularly, the processing device 202 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. The processing device 202 may also be one or more special-purpose processing devices such as an application specific integrated circuit (ASIC), a field programmable gate array (FPGA), a digital signal processor (DSP), network processor, or the like. The processing device 202 may be configured to execute processing logic 226 for performing various operations and steps discussed herein.

The computer 200 may further include a network interface device 208. The computer 200 also may include a video display unit 210 (e.g., a liquid crystal display (LCD) or a cathode ray tube (CRT)), an alphanumeric input device 212 (e.g., a keyboard), a cursor control device 214 (e.g., a mouse), and a signal generation device 216 (e.g., a speaker). The data storage device 218 may include a non-transitory computer-readable storage medium 230 (also known as a non-transitory computer-readable storage medium or a non-transitory computer-readable medium) on which is stored one or more sets of instructions 222 (e.g., software, software modules) embodying any one or more of the methodologies or functions described herein. The software 222 may also reside, completely or at least partially, within main memory 204 and/or within processing device 202 during execution thereof by computer 200—main memory 204 and processing device 202 also constituting computer-accessible storage media. The software 222 may further be transmitted or received over a network 220 via network interface device 208.

While the computer-readable storage medium 230 is shown in an exemplary embodiment to be a single medium, the terms "computer-readable storage medium" and "machine-accessible storage medium" should be understood to include a single medium or multiple media (e.g., a centralized or distributed database, and/or associated caches and servers) that store the one or more sets of instructions. The term "computer-readable storage medium" should also be understood to include any medium that is capable of storing, encoding or carrying a set of instructions for execution by the computer and that cause the computer to perform any one or more of the methodologies of the present invention. The term "computer-readable storage medium" should accordingly be understood to include, but not be limited to, solid-state memories, optical and magnetic media, etc.

Exemplary System Platform

According to various embodiments, the processes and logic flows described in this specification may be performed by a system (e.g., System 100) that includes, but is not limited to, one or more programmable processors (e.g., processor 202) executing one or more computer program modules to perform functions by operating on input data and generating output, thereby tying the process to a particular machine (e.g., a machine programmed to perform the processes described herein). This includes processors located in one or more of client computers (e.g., client computers 140, 150, 160, 170, 180, 190 of FIG. 1). These devices connected to network 110 may access and execute one or more Internet browser-based program modules that are "served up" through the network 110 by one or more servers (e.g., server 120 of FIG. 1), and the data associated with the program may be stored on a one or more storage devices, which may reside within a server or computing device (e.g., Main Memory 204, Static Memory 206), be attached as a peripheral storage device to the one or more servers or computing devices, or attached to the network (e.g., Storage 130).

The System 100 facilitates the acquisition, storage, maintenance, use, and retention of campaign data associated with a plurality of privacy campaigns within an organization. In doing so, various aspects of the System 100 initiates and creates a plurality of individual data privacy campaign records that are associated with a variety of privacy-related attributes and assessment related meta-data for each campaign. These data elements may include: the subjects of the sensitive information, the respective person or entity responsible for each campaign (e.g., the campaign's "owner"), the location where the personal data will be stored, the entity or entities that will access the data, the parameters according to which the personal data will be used and retained, the Risk Level associated with a particular campaign (as well as assessments from which the Risk Level is calculated), an audit schedule, and other attributes and meta-data. The System 100 may also be adapted to facilitate the setup and auditing of each privacy campaign. These modules may include, for example, a Main Privacy Compliance Module, a Risk Assessment Module, a Privacy Audit Module, and a Communications Module (examples of which are described below). It is to be understood that these are examples of modules of various embodiments, but the functionalities performed by each module as described may be performed by more (or less) modules. Further, the functionalities described as being performed by one module may be performed by one or more other modules.

A. Example Elements Related to Privacy Campaigns

Figure 3:
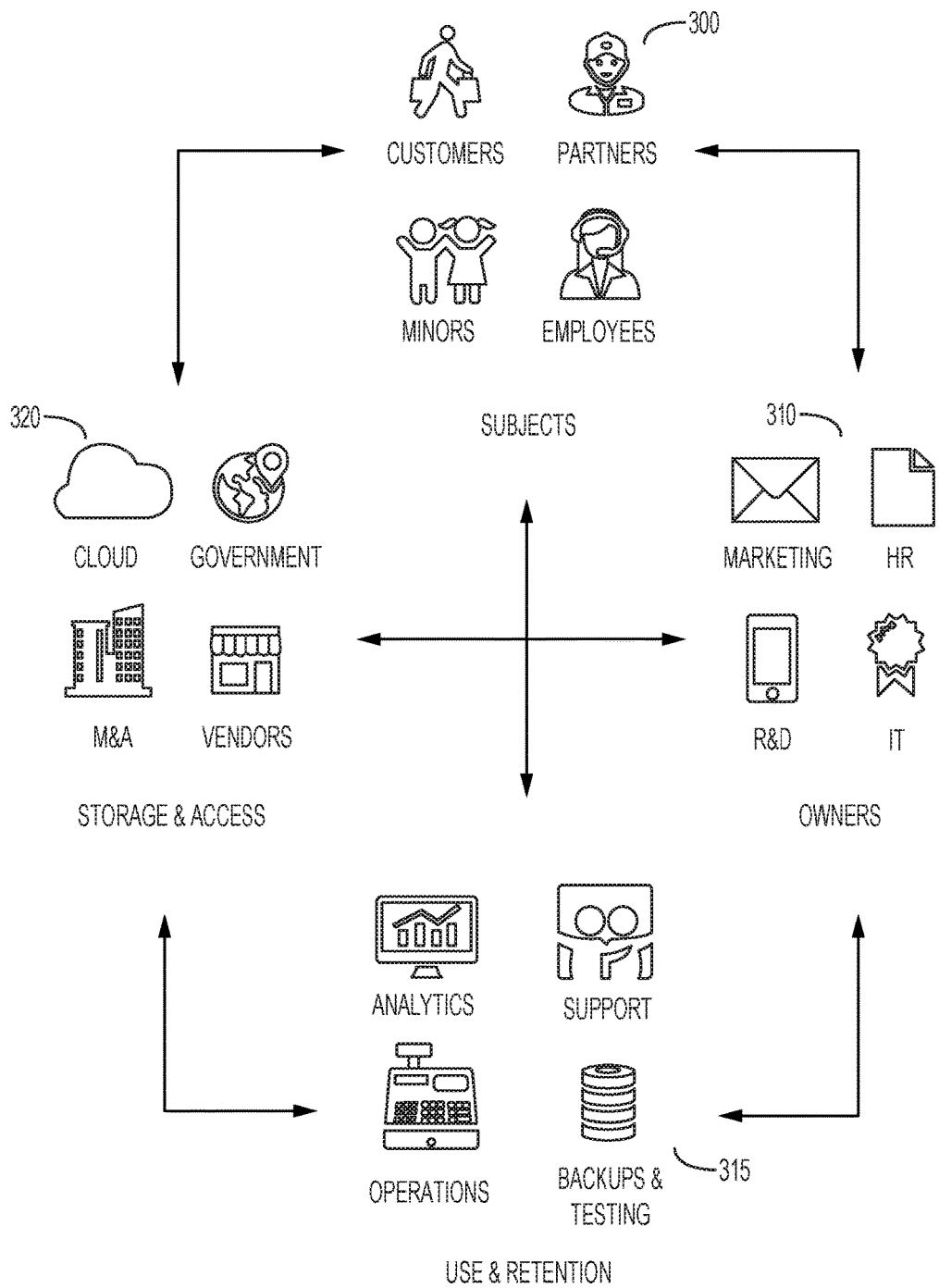
FIG. 3 is a diagram illustrating an example of the elements (e.g., subjects, owner, etc.) that may be involved in privacy compliance.

FIG. 3 provides a high-level visual overview of example "subjects" for particular data privacy campaigns, exemplary campaign "owners," various elements related to the storage and access of personal data, and elements related to the use and retention of the personal data. Each of these elements may, in various embodiments, be accounted for by the System 100 as it facilitates the implementation of an organization's privacy compliance policy.

As may be understood from FIG. 3, sensitive information may be collected by an organization from one or more subjects 300. Subjects 300 may include customers whose information has been obtained by the organization. For example, if the organization is selling goods to a customer, the organization may have been provided with a customer's credit card or banking information (e.g., account number, bank routing number), social security number, or other sensitive information.

An organization may also possess personal data originating from one or more of its business partners. Examples of business partners are vendors that may be data controllers or data processors (which have different legal obligations under EU data protection laws). Vendors may supply a component or raw material to the organization, or an outside contractor responsible for the marketing or legal work of the organization. The personal data acquired from the partner may be that of the partners, or even that of other entities collected by the partners. For example, a marketing agency may collect personal data on behalf of the organization, and transfer that information to the organization. Moreover, the organization may share personal data with one of its partners. For example, the organization may provide a marketing agency with the personal data of its customers so that it may conduct further research.

Other subjects 300 include the organization's own employees. Organizations with employees often collect personal data from their employees, including address and social security information, usually for payroll purposes, or even prior to employment, for conducting credit checks. The subjects 300 may also include minors. It is noted that various corporate privacy policies or privacy laws may require that organizations take additional steps to protect the sensitive privacy of minors.

Still referring to FIG. 3, within an organization, a particular individual (or groups of individuals) may be designated to be an "owner" of a particular campaign to obtain and manage personal data. These owners 310 may have any suitable role within the organization. In various embodiments, an owner of a particular campaign will have primary responsibility for the campaign, and will serve as a resident expert regarding the personal data obtained through the campaign, and the way that the data is obtained, stored, and accessed. As shown in FIG. 3, an owner may be a member of any suitable department, including the organization's marketing, HR, R&D, or IT department. As will be described below, in exemplary embodiments, the owner can always be changed, and owners can sub-assign other owners (and other collaborators) to individual sections of campaign data input and operations.

Referring still to FIG. 3, the system may be configured to account for the use and retention 315 of personal data obtained in each particular campaign. The use and retention of personal data may include how the data is analyzed and used within the organization's operations, whether the data is backed up, and which parties within the organization are supporting the campaign.

The system may also be configured to help manage the storage and access 320 of personal data. As shown in FIG. 3, a variety of different parties may access the data, and the data may be stored in any of a variety of different locations, including on-site, or in "the cloud", i.e., on remote servers that are accessed via the Internet or other suitable network. Additionally, vendors may provide computer systems and/or software applications that use the personal data.

B. Main Compliance Module

Figure 4:
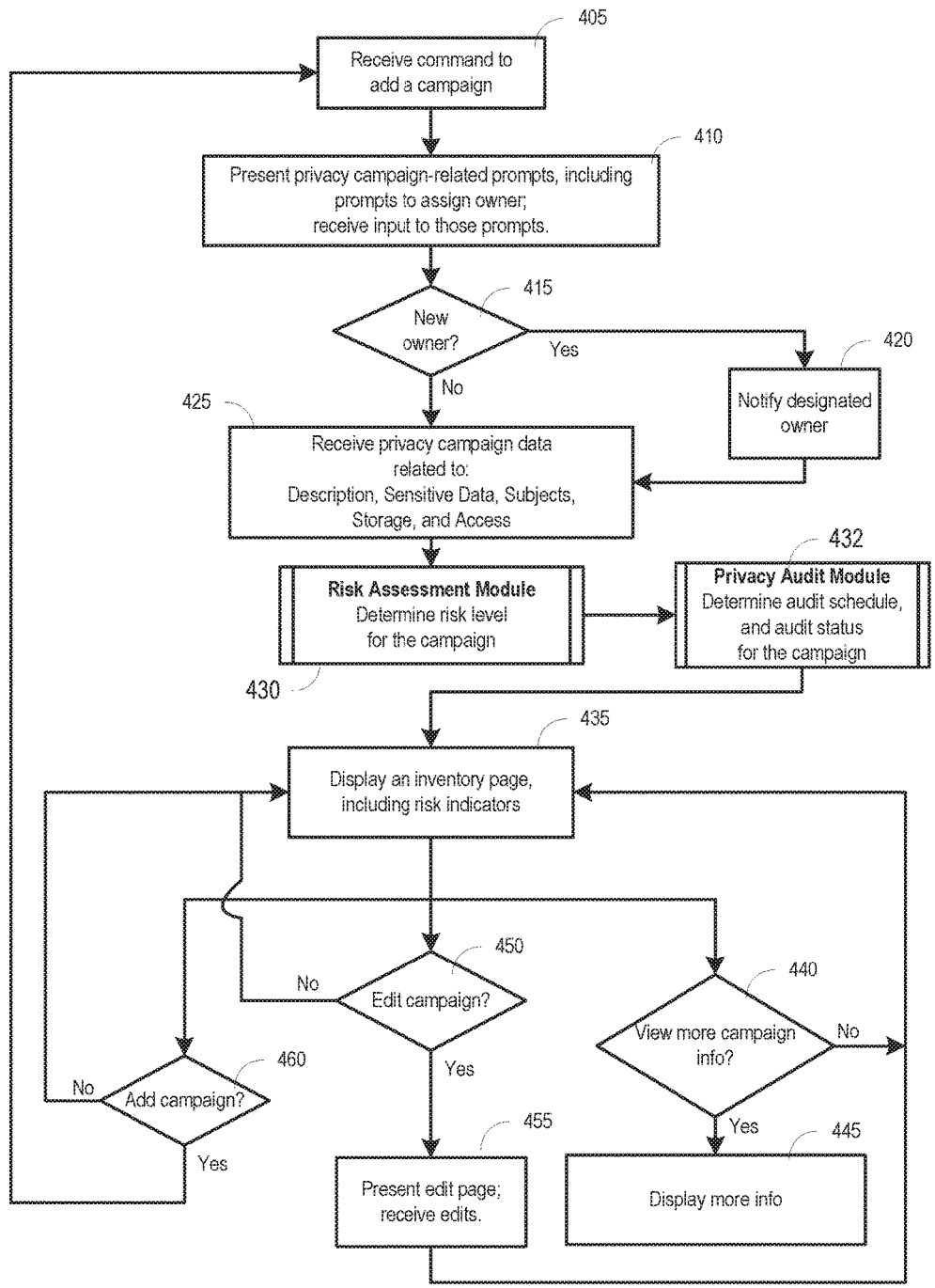
FIG. 4 is a flow chart showing an example of a process performed by the Main Privacy Compliance Module.

FIG. 4 illustrates an exemplary process for operationalizing privacy compliance. Main Privacy Compliance Module 400, which may be executed by one or more computing devices of System 100, may perform this process. In exemplary embodiments, a server (e.g., server 140) in conjunction with a client computing device having a browser, execute the Main Privacy Compliance Module (e.g., computing devices 140, 150, 160, 170, 180, 190) through a network (network 110). In various exemplary embodiments, the Main Privacy Compliance Module 400 may call upon other modules to perform certain functions. In exemplary embodiments, the software may also be organized as a single module to perform various computer executable routines.

I. Adding a Campaign

The process 400 may begin at step 405, wherein the Main Privacy Compliance Module 400 of the System 100 receives a command to add a privacy campaign. In exemplary embodiments, the user selects an on-screen button (e.g., the Add Data Flow button 1755 of FIG. 17) that the Main Privacy Compliance Module 400 displays on a landing page, which may be displayed in a graphical user interface (GUI), such as a window, dialog box, or the like. The landing page may be, for example, the inventory page 1700 below. The inventory page 1700 may display a list of one or more privacy campaigns that have already been input into the System 100. As mentioned above, a privacy campaign may represent, for example, a business operation that the organization is engaged in, or some business record, that may require the use of personal data, which may include the personal data of a customer or some other entity. Examples of campaigns might include, for example, Internet Usage History, Customer Payment Information, Call History Log, Cellular Roaming Records, etc. For the campaign "Internet Usage History," a marketing department may need customers' on-line browsing patterns to run analytics. This might entail retrieving and storing customers' IP addresses, MAC address, URL history, subscriber ID, and other information that may be considered personal data (and even sensitive personal data). As will be described herein, the System 100, through the use of one or more modules, including the Main Privacy Campaign Module 400, creates a record for each campaign. Data elements of campaign data may be associated with each campaign record that represents attributes such as: the type of personal data associated with the campaign; the subjects having access to the personal data; the person or persons within the company that take ownership (e.g., business owner) for ensuring privacy compliance for the personal data associated with each campaign; the location of the personal data; the entities having access to the data; the various computer systems and software applications that use the personal data; and the Risk Level (see below) associated with the campaign.

II. Entry of Privacy Campaign Related Information, Including Owner

At step 410, in response to the receipt of the user's command to add a privacy campaign record, the Main Privacy Compliance Module 400 initiates a routine to create an electronic record for a privacy campaign, and a routine for the entry data inputs of information related to the privacy campaign. The Main Privacy Compliance Module 400 may generate one or more graphical user interfaces (e.g., windows, dialog pages, etc.), which may be presented one GUI at a time. Each GUI may show prompts, editable entry fields, check boxes, radial selectors, etc., where a user may enter or select privacy campaign data. In exemplary embodiments, the Main Privacy Compliance Module 400 displays on the graphical user interface a prompt to create an electronic record for the privacy campaign. A user may choose to add a campaign, in which case the Main Privacy Compliance Module 400 receives a command to create the electronic record for the privacy campaign, and in response to the command, creates a record for the campaign and digitally stores the record for the campaign. The record for the campaign may be stored in, for example, storage 130, or a storage device associated with the Main Privacy Compliance Module (e.g., a hard drive residing on Server 110, or a peripheral hard drive attached to Server 110).

The user may be a person who works in the Chief Privacy Officer's organization (e.g., a privacy office rep, or privacy officer). The privacy officer may be the user that creates the campaign record, and enters initial portions of campaign data (e.g., "high level" data related to the campaign), for example, a name for the privacy campaign, a description of the campaign, and a business group responsible for administering the privacy operations related to that campaign. The Main Privacy Compliance Module 400 may also prompt the user to enter a person or entity responsible for each campaign (e.g., the campaign's "owner"). The owner may be tasked with the responsibility for ensuring or attempting to ensure that the privacy policies or privacy laws associated with personal data related to a particular privacy campaign are being complied with. In exemplary embodiments, the default owner of the campaign may be the person who initiated the creation of the privacy campaign. That owner may be a person who works in the Chief Privacy Officer's organization (e.g., a privacy office rep, or privacy officer). The initial owner of the campaign may designate someone else to be the owner of the campaign. The designee may be, for example, a representative of some business unit within the organization (a business rep). Additionally, more than one owner may be assigned. For example, the user may assign a primary business rep, and may also assign a privacy office rep as owners of the campaign.

In many instances, some or most of the required information related to the privacy campaign record might not be within the knowledge of the default owner (i.e., the privacy office rep). The Main Data Compliance Module 400 can be operable to allow the creator of the campaign record (e.g., a privacy officer rep) to designate one or more other collaborators to provide at least one of the data inputs for the campaign data. Different collaborators, which may include the one or more owners, may be assigned to different questions, or to specific questions within the context of the privacy campaign. Additionally, different collaborators may be designated to respond to pats of questions. Thus, portions of campaign data may be assigned to different individuals.

Still referring to FIG. 4, if at step 415 the Main Privacy Compliance Module 400 has received an input from a user to designate a new owner for the privacy campaign that was created, then at step 420, the Main Privacy Compliance Module 400 may notify that individual via a suitable notification that the privacy campaign has been assigned to him or her. Prior to notification, the Main Privacy Compliance Module 400 may display a field that allows the creator of the campaign to add a personalized message to the newly assigned owner of the campaign to be included with that notification. In exemplary embodiments, the notification may be in the form of an email message. The email may include the personalized message from the assignor, a standard message that the campaign has been assigned to him/her, the deadline for completing the campaign entry, and instructions to log in to the system to complete the privacy campaign entry (along with a hyperlink that takes the user to a GUI providing access to the Main Privacy Compliance Module 400. Also included may be an option to reply to the email if an assigned owner has any questions, or a button that when clicked on, opens up a chat window (i.e., instant messenger window) to allow the newly assigned owner and the assignor a GUI in which they are able to communicate in real-time. An example of such a notification appears in FIG. 16 below. In addition to owners, collaborators that are assigned to input portions of campaign data may also be notified through similar processes. In exemplary embodiments, The Main Privacy Compliance Module 400 may, for example through a Communications Module, be operable to send collaborators emails regarding their assignment of one or more portions of inputs to campaign data. Or through the Communications Module, selecting the commentators button brings up one or more collaborators that are on-line (with the off-line users still able to see the messages when they are back on-line. Alerts indicate that one or more emails or instant messages await a collaborator.

At step 425, regardless of whether the owner is the user (i.e., the creator of the campaign), "someone else" assigned by the user, or other collaborators that may be designated with the task of providing one or more items of campaign data, the Main Privacy Campaign Module 400 may be operable to electronically receive campaign data inputs from one or more users related to the personal data related to a privacy campaign through a series of displayed computer-generated graphical user interfaces displaying a plurality of prompts for the data inputs. In exemplary embodiments, through a step-by-step process, the Main Privacy Campaign Module may receive from one or more users' data inputs that include campaign data like: (1) a description of the campaign; (2) one or more types of personal data to be collected and stored as part of the campaign; (3) individuals from which the personal data is to be collected; (4) the storage location of the personal data, and (5) information regarding who will have access to the personal data. These inputs may be obtained, for example, through the graphical user interfaces shown in FIGS. 10 through 15, wherein the Main Compliance Module 400 presents on sequentially appearing GUIs the prompts for the entry of each of the enumerated campaign data above. The Main Compliance Module 400 may process the campaign data by electronically associating the campaign data with the record for the campaign and digitally storing the campaign data with the record for the campaign. The campaign data may be digitally stored as data elements in a database residing in a memory location in the server 120, a peripheral storage device attached to the server, or one or more storage devices connected to the network (e.g., storage 130). If campaign data inputs have been assigned to one or more collaborators, but those collaborators have not input the data yet, the Main Compliance Module 400 may, for example through the Communications Module, sent an electronic message (such as an email) alerting the collaborators and owners that they have not yet supplied their designated portion of campaign data.

III. Privacy Campaign Information Display

At step 430, Main Privacy Compliance Module 400 may, in exemplary embodiments, call upon a Risk Assessment Module 430 that may determine and assign a Risk Level for the privacy campaign, based wholly or in part on the information that the owner(s) have input. The Risk Assessment Module 430 will be discussed in more detail below.

At step 432, Main Privacy Compliance Module 400 may in exemplary embodiments, call upon a Privacy Audit Module 432 that may determine an audit schedule for each privacy campaign, based, for example, wholly or in part on the campaign data that the owner(s) have input, the Risk Level assigned to a campaign, and/or any other suitable factors. The Privacy Audit Module 432 may also be operable to display the status of an audit for each privacy campaign. The Privacy Audit Module 432 will be discussed in more detail below.

At step 435, the Main Privacy Compliance Module 400 may generate and display a GUI showing an inventory page (e.g., inventory page 1700) that includes information associated with each campaign. That information may include information input by a user (e.g., one or more owners), or information calculated by the Main Privacy Compliance Module 400 or other modules. Such information may include for example, the name of the campaign, the status of the campaign, the source of the campaign, the storage location of the personal data related to the campaign, etc. The inventory page 1700 may also display an indicator representing the Risk Level (as mentioned, determined for each campaign by the Risk Assessment Module 430), and audit information related to the campaign that was determined by the Privacy Audit Module (see below). The inventory page 1700 may be the landing page displayed to users that access the system. Based on the login information received from the user, the Main Privacy Compliance Module may determine which campaigns and campaign data the user is authorized to view, and display only the information that the user is authorized to view. Also from the inventory page 1700, a user may add a campaign (discussed above in step 405), view more information for a campaign, or edit information related to a campaign (see, e.g., FIGS. 17, 16, 18).

If other commands from the inventory page are received (e.g., add a campaign, view more information, edit information related to the campaign), then step 440, 450, and/or 460 may be executed.

At step 440, if a command to view more information has been received or detected, then at step 445, the Main Privacy Compliance Module 400 may present more information about the campaign, for example, on a suitable campaign information page 1700.

At step 450, if the system has received a request to edit a campaign, then, at step 455, the system may display a dialog page that allows a user to edit information regarding the campaign (e.g., edit campaign dialog 1700).

At step 460, if the system has received a request to add a campaign, the process may proceed back to step 405.

C. Risk Assessment Module

Figure 5:
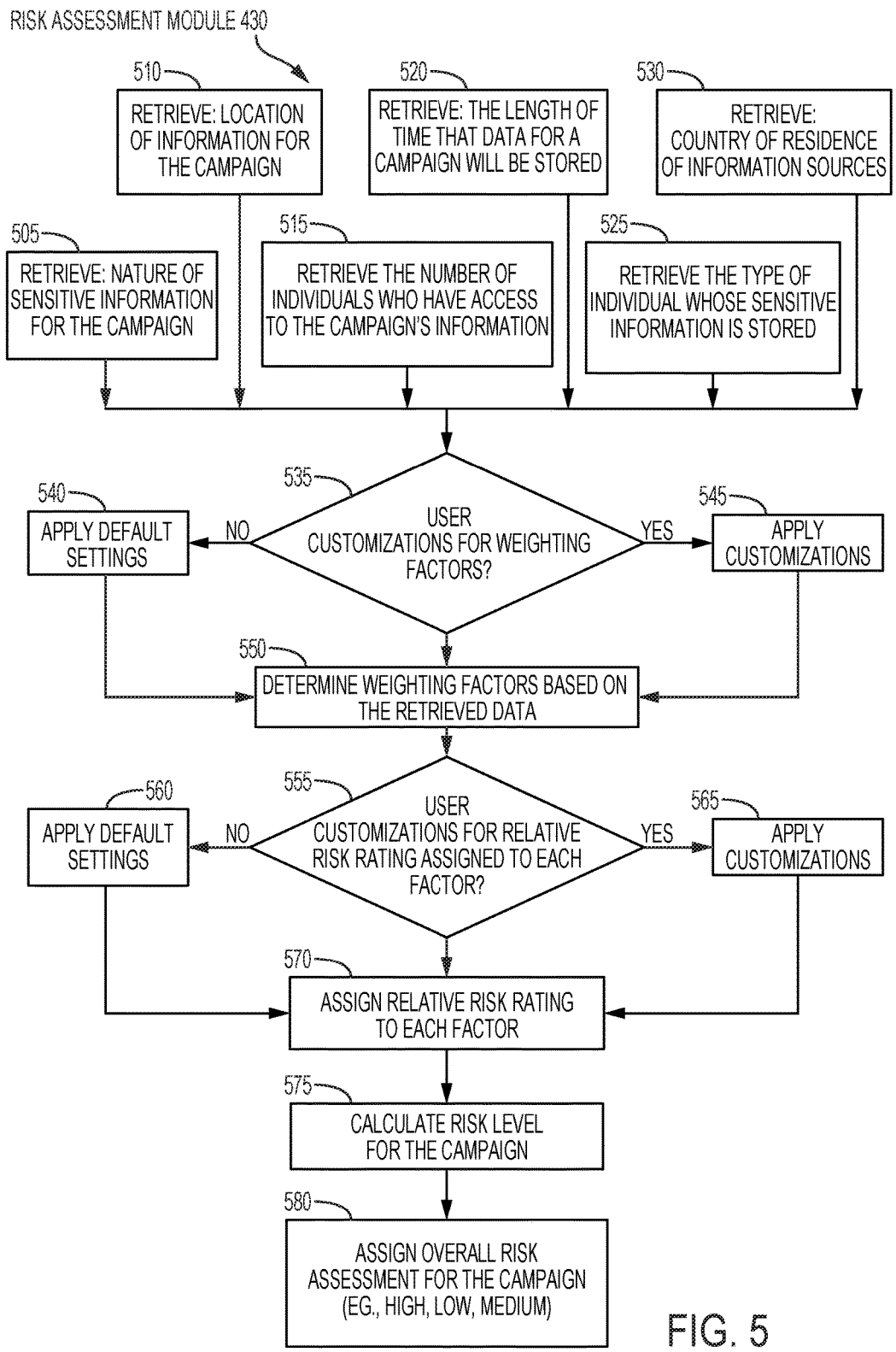
FIG. 5 is a flow chart showing an example of a process performed by the Risk Assessment Module.

FIG. 5 illustrates an exemplary process for determining a Risk Level and Overall Risk Assessment for a particular privacy campaign performed by Risk Assessment Module 430.

I. Determining Risk Level

In exemplary embodiments, the Risk Assessment Module 430 may be operable to calculate a Risk Level for a campaign based on the campaign data related to the personal data associated with the campaign. The Risk Assessment Module may associate the Risk Level with the record for the campaign and digitally store the Risk Level with the record for the campaign.

The Risk Assessment Module 430 may calculate this Risk Level based on any of various factors associated with the campaign. The Risk Assessment Module 430 may determine a plurality of weighting factors based upon, for example: (1) the nature of the sensitive information collected as part of the campaign (e.g., campaigns in which medical information, financial information or non-public personal identifying information is collected may be indicated to be of higher risk than those in which only public information is collected, and thus may be assigned a higher numerical weighting factor); (2) the location in which the information is stored (e.g., campaigns in which data is stored in the cloud may be deemed higher risk than campaigns in which the information is stored locally); (3) the number of individuals who have access to the information (e.g., campaigns that permit relatively large numbers of individuals to access the personal data may be deemed more risky than those that allow only small numbers of individuals to access the data); (4) the length of time that the data will be stored within the system (e.g., campaigns that plan to store and use the personal data over a long period of time may be deemed more risky than those that may only hold and use the personal data for a short period of time); (5) the individuals whose sensitive information will be stored (e.g., campaigns that involve storing and using information of minors may be deemed of greater risk than campaigns that involve storing and using the information of adults); (6) the country of residence of the individuals whose sensitive information will be stored (e.g., campaigns that involve collecting data from individuals that live in countries that have relatively strict privacy laws may be deemed more risky than those that involve collecting data from individuals that live in countries that have relative lax privacy laws). It should be understood that any other suitable factors may be used to assess the Risk Level of a particular campaign, including any new inputs that may need to be added to the risk calculation.

In particular embodiments, one or more of the individual factors may be weighted (e.g., numerically weighted) according to the deemed relative importance of the factor relative to other factors (i.e., Relative Risk Rating).

These weightings may be customized from organization to organization, and/or according to different applicable laws. In particular embodiments, the nature of the sensitive information will be weighted higher than the storage location of the data, or the length of time that the data will be stored.

In various embodiments, the system uses a numerical formula to calculate the Risk Level of a particular campaign. This formula may be, for example: Risk Level for campaign=(Weighting Factor of Factor 1)*(Relative Risk Rating of Factor 1)+(Weighting Factor of Factor 2)*(Relative Risk Rating of Factor 2)+(Weighting Factor of Factor N)*(Relative Risk Rating of Factor N). As a simple example, the Risk Level for a campaign that only collects publicly available information for adults and that stores the information locally for a short period of several weeks might be determined as Risk Level=(Weighting Factor of Nature of Sensitive Information)*(Relative Risk Rating of Particular Sensitive Information to be Collected)+(Weighting Factor of Individuals from which Information is to be Collected)*(Relative Risk Rating of Individuals from which Information is to be Collected)+(Weighting Factor of Duration of Data Retention)*(Relative Risk Rating of Duration of Data Retention)+(Weighting Factor of Individuals from which Data is to be Collected)*(Relative Risk Rating of Individuals from which Data is to be Collected). In this example, the Weighting Factors may range, for example from 1-5, and the various Relative Risk Ratings of a factor may range from 1-10. However, the system may use any other suitable ranges.

In particular embodiments, the Risk Assessment Module 430 may have default settings for assigning Overall Risk Assessments to respective campaigns based on the numerical Risk Level value determined for the campaign, for example, as described above. The organization may also modify these settings in the Risk Assessment Module 430 by assigning its own Overall Risk Assessments based on the numerical Risk Level. For example, the Risk Assessment Module 430 may, based on default or user assigned settings, designate: (1) campaigns with a Risk Level of 1-7 as "low risk" campaigns, (2) campaigns with a Risk Level of 8-15 as "medium risk" campaigns; (3) campaigns with a Risk Level of over 16 as "high risk" campaigns. As show below, in an example inventory page 1700, the Overall Risk Assessment for each campaign can be indicated by up/down arrow indicators, and further, the arrows may have different shading (or color, or portions shaded) based upon this Overall Risk Assessment. The selected colors may be conducive for viewing by those who suffer from color blindness.

Thus, the Risk Assessment Module 430 may be configured to automatically calculate the numerical Risk Level for each campaign within the system, and then use the numerical Risk Level to assign an appropriate Overall Risk Assessment to the respective campaign. For example, a campaign with a Risk Level of 5 may be labeled with an Overall Risk Assessment as "Low Risk". The system may associate both the Risk Level and the Overall Risk Assessment with the campaign and digitally store them as part of the campaign record.

II. Exemplary Process for Assessing Risk

Accordingly, as shown in FIG. 5, in exemplary embodiments, the Risk Assessment Module 430 electronically retrieves from a database (e.g., storage device 130) the campaign data associated with the record for the privacy campaign. It may retrieve this information serially, or in parallel. At step 505, the Risk Assessment Module 430 retrieves information regarding (1) the nature of the sensitive information collected as part of the campaign. At step 510, the Risk Assessment Module 430 retrieves information regarding the (2) the location in which the information related to the privacy campaign is stored. At step 515, the Risk Assessment Module 430 retrieves information regarding (3) the number of individuals who have access to the information. At step 520, the Risk Assessment Module retrieves information regarding (4) the length of time that the data associated with a campaign will be stored within the System 100. At step 525, the Risk Assessment Module retrieves information regarding (5) the individuals whose sensitive information will be stored. At step 530, the Risk Assessment Module retrieves information regarding (6) the country of residence of the individuals whose sensitive information will be stored.

At step 535, the Risk Assessment Module takes into account any user customizations to the weighting factors related to each of the retrieved factors from steps 505, 510, 515, 520, 525, and 530. At steps 540 and 545, the Risk Assessment Module applies either default settings to the weighting factors (which may be based on privacy laws), or customizations to the weighting factors. At step 550, the Risk Assessment Module determines a plurality of weighting factors for the campaign. For example, for the factor related to the nature of the sensitive information collected as part of the campaign, a weighting factor of 1-5 may be assigned based on whether non-public personal identifying information is collected.

At step 555, the Risk Assessment Module takes into account any user customizations to the Relative Risk assigned to each factor, and at step 560 and 565, will either apply default values (which can be based on privacy laws) or the customized values for the Relative Risk. At step 570, the Risk Assessment Module assigns a relative risk rating for each of the plurality of weighting factors. For example, the relative risk rating for the location of the information of the campaign may be assigned a numerical number (e.g., from 1-10) that is lower than the numerical number assigned to the Relative Risk Rating for the length of time that the sensitive information for that campaign is retained.

At step 575, the Risk Assessment Module 430 calculates the relative risk assigned to the campaign based upon the plurality of Weighting Factors and the Relative Risk Rating for each of the plurality of factors. As an example, the Risk Assessment Module 430 may make this calculation using the formula of Risk Level=(Weighting Factor of Factor 1)*(Relative Risk Rating of Factor 1)+(Weighting Factor of Factor 2)*(Relative Risk Rating of Factor 2)+ . . . (Weighting Factor of Factor N)*(Relative Risk Rating of Factor N).

At step 580, based upon the numerical value derived from step 575, the Risk Assessment Module 430 may determine an Overall Risk Assessment for the campaign. The Overall Risk Assessment determination may be made for the privacy campaign may be assigned based on the following criteria, which may be either a default or customized setting: (1) campaigns with a Risk Level of 1-7 as "low risk" campaigns, (2) campaigns with a Risk Level of 8-15 as "medium risk" campaigns; (3) campaigns with a Risk Level of over 16 as "high risk" campaigns. The Overall Risk Assessment is then associated and stored with the campaign record.

D. Privacy Audit Module

The System 100 may determine an audit schedule for each campaign, and indicate, in a particular graphical user interface (e.g., inventory page 1700), whether a privacy audit is coming due (or is past due) for each particular campaign and, if so, when the audit is/was due. The System 100 may also be operable to provide an audit status for each campaign, and alert personnel of upcoming or past due privacy audits. To further the retention of evidence of compliance, the System 100 may also receive and store evidence of compliance. A Privacy Audit Module 432, may facilitate these functions.

I. Determining a Privacy Audit Schedule and Monitoring Compliance

In exemplary embodiments, the Privacy Audit Module 432 is adapted to automatically schedule audits and manage compliance with the audit schedule. In particular embodiments, the system may allow a user to manually specify an audit schedule for each respective campaign. The Privacy Audit Module 432 may also automatically determine, and save to memory, an appropriate audit schedule for each respective campaign, which in some circumstances, may be editable by the user.

The Privacy Audit Module 432 may automatically determine the audit schedule based on the determined Risk Level of the campaign. For example, all campaigns with a Risk Level less than 10 may have a first audit schedule and all campaigns with a Risk Level of 10 or more may have a second audit schedule. The Privacy Audit Module may also be operable determine the audit schedule based on the Overall Risk Assessment for the campaign (e.g., "low risk" campaigns may have a first predetermined audit schedule, "medium risk" campaigns may have a second predetermined audit schedule, "high risk" campaigns may have a third predetermined audit schedule, etc.).

In particular embodiments, the Privacy Audit Module 432 may automatically facilitate and monitor compliance with the determined audit schedules for each respective campaign. For example, the system may automatically generate one or more reminder emails to the respective owners of campaigns as the due date approaches. The system may also be adapted to allow owners of campaigns, or other users, to submit evidence of completion of an audit (e.g., by, for example, submitting screen shots that demonstrate that the specified parameters of each campaign are being followed). In particular embodiments, the system is configured for, in response to receiving sufficient electronic information documenting completion of an audit, resetting the audit schedule (e.g., scheduling the next audit for the campaign according to a determined audit schedule, as determined above).

II. Exemplary Privacy Audit Process

Figure 6:
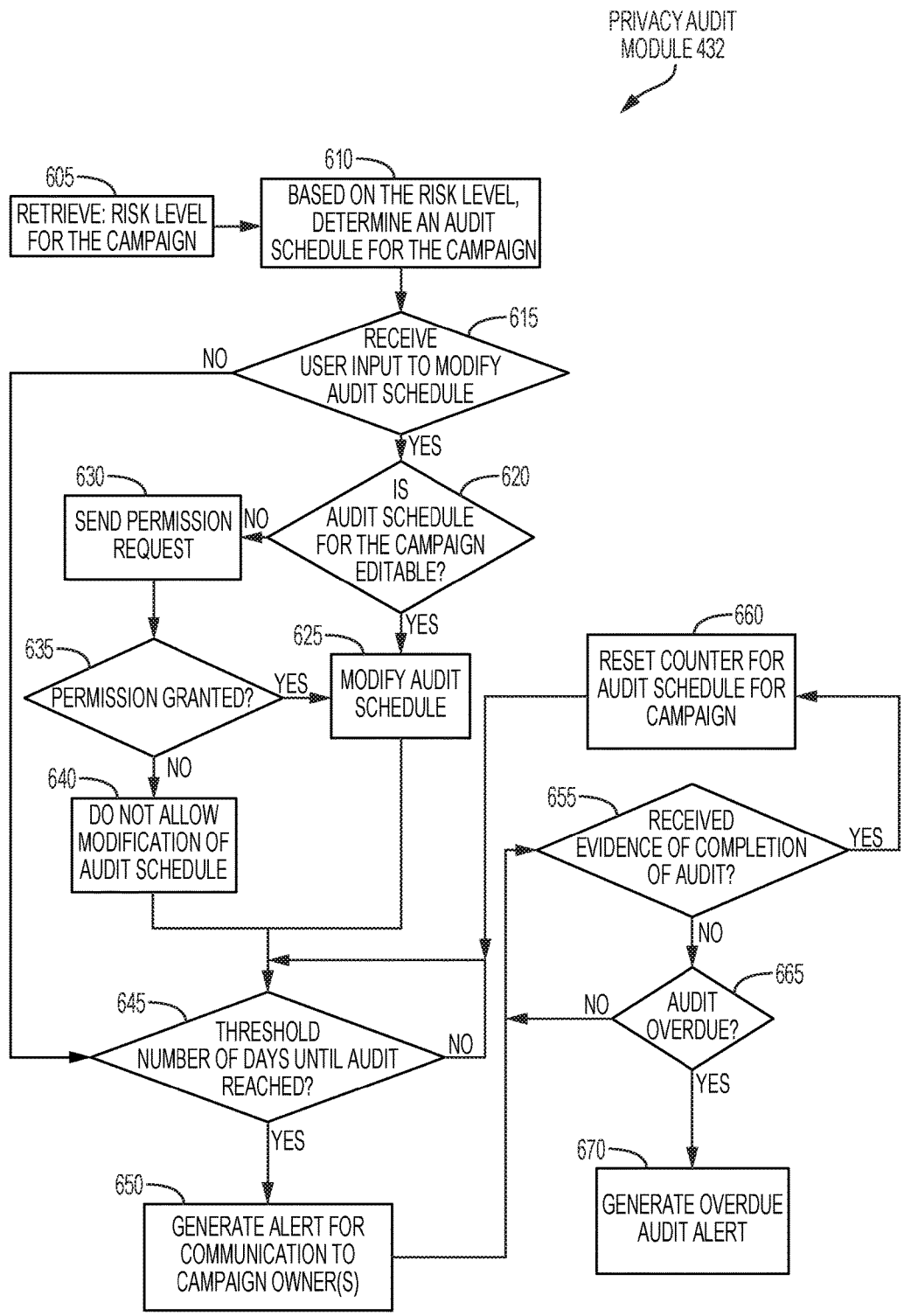
FIG. 6 is a flow chart showing an example of a process performed by the Privacy Audit Module.
Figure 7:
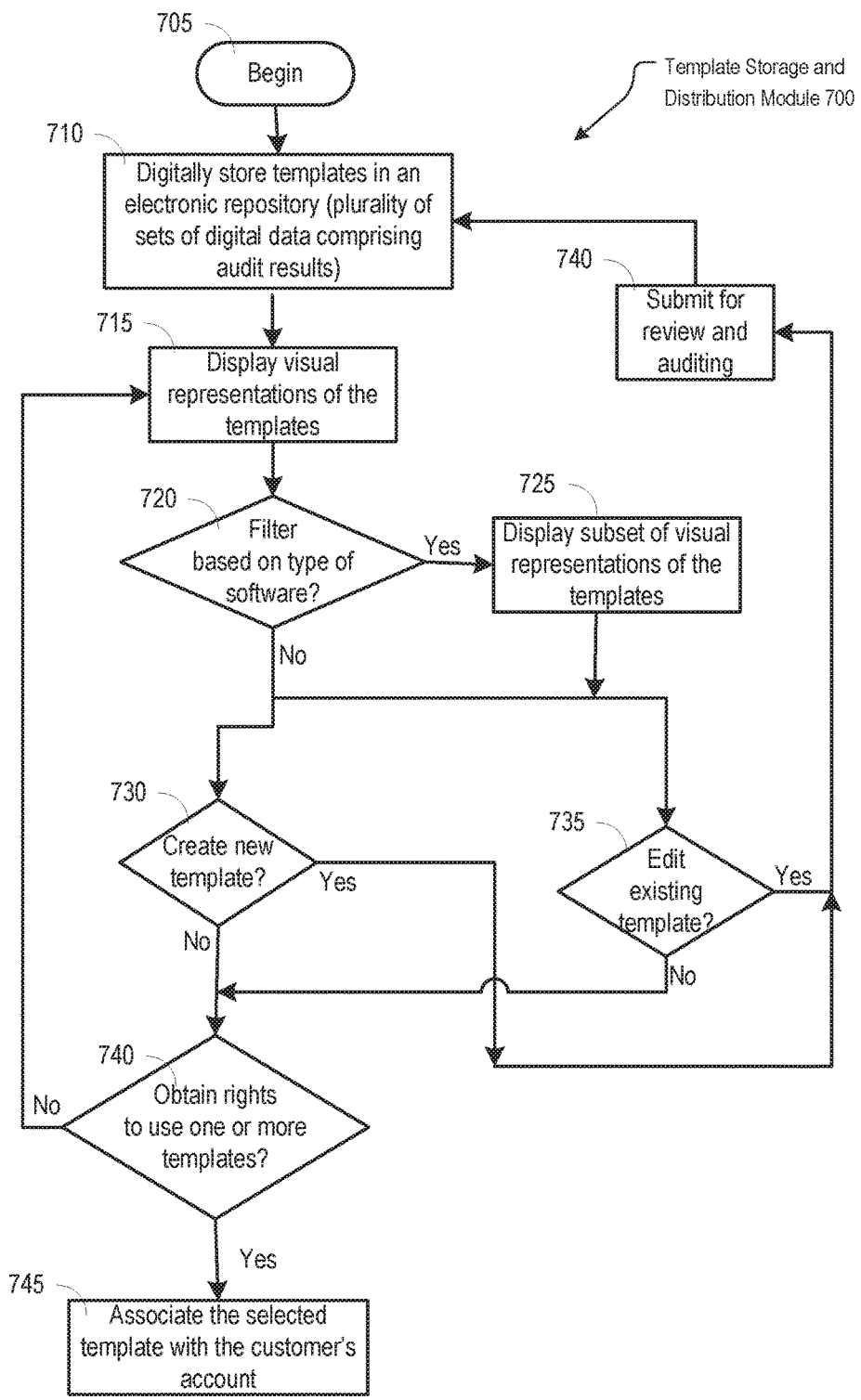
FIG. 7 is a flow chart showing an example of a process performed by the Template Storage and Distribution Module.
Figure 8:
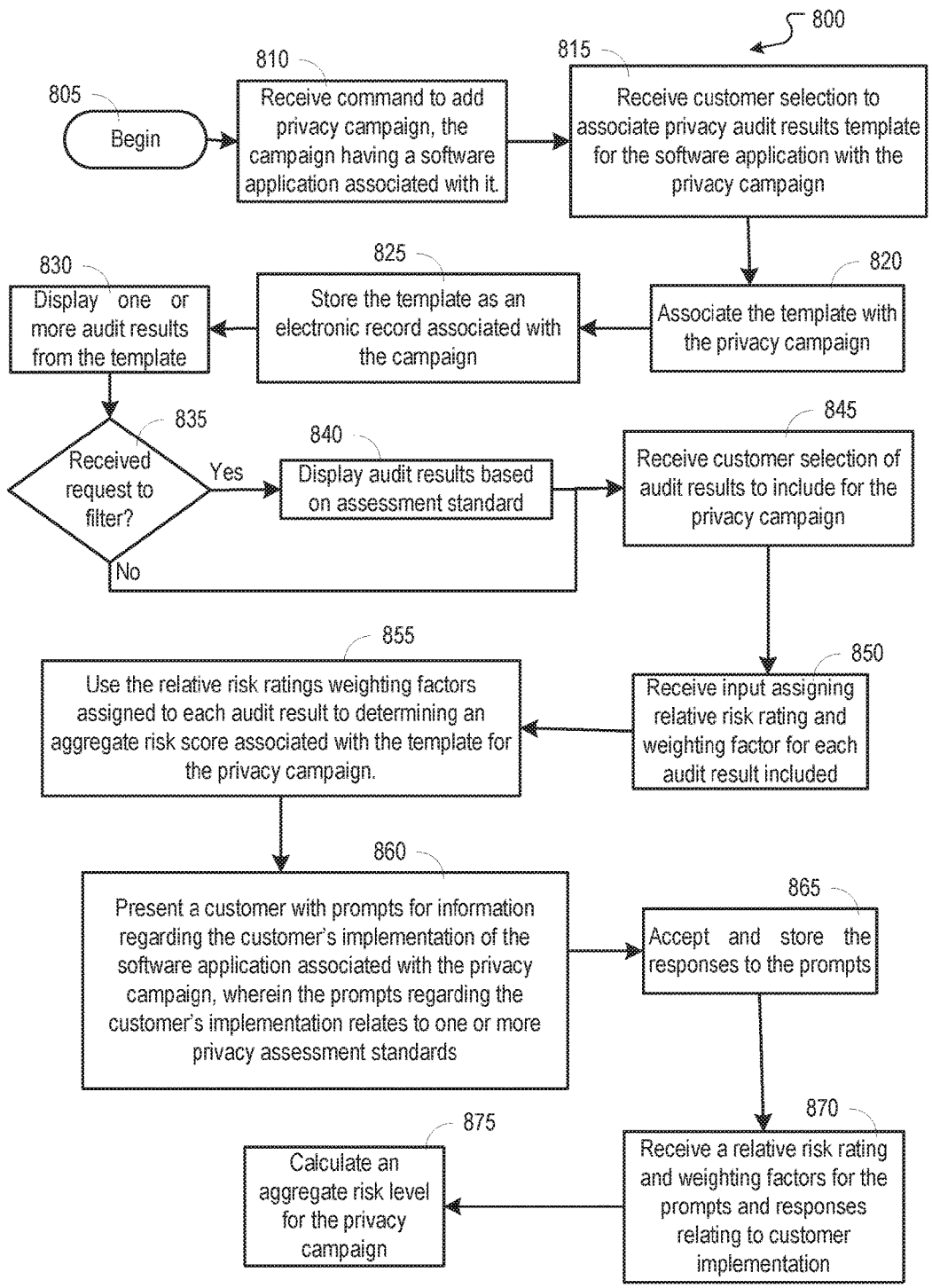
FIG. 8 is a flow chart showing an example of a process performed by the Audit Results and Customer Implementation Module.

FIG. 6 illustrates an exemplary process performed by a Privacy Audit Module 432 for assigning a privacy audit schedule and facilitating and managing compliance for a particular privacy campaign. At step 605, the Privacy Audit Module 432 retrieves the Risk Level associated with the privacy campaign. In exemplary embodiments, the Risk Level may be a numerical number, as determined above by the Risk Assessment Module 430. If the organization chooses, the Privacy Audit Module 432 may use the Overall Risk Assessment to determine which audit schedule for the campaign to assign.

At step 610, based on the Risk Level of the campaign (or the Overall Risk Assessment), or based on any other suitable factor, the Privacy Audit Module 432 can assign an audit schedule for the campaign. The audit schedule may be, for example, a timeframe (i.e., a certain amount of time, such as number of days) until the next privacy audit on the campaign to be performed by the one or more owners of the campaign. The audit schedule may be a default schedule. For example, the Privacy Audit Module can automatically apply an audit schedule of 120 days for any campaign having Risk Level of 10 and above. These default schedules may be modifiable. For example, the default audit schedule for campaigns having a Risk Level of 10 and above can be changed from 120 days to 150 days, such that any campaign having a Risk Level of 10 and above is assigned the customized default audit schedule (i.e., 150 days). Depending on privacy laws, default policies, authority overrides, or the permission level of the user attempting to modify this default, the default might not be modifiable.

At step 615, after the audit schedule for a particular campaign has already been assigned, the Privacy Audit Module 432 determines if a user input to modify the audit schedule has been received. If a user input to modify the audit schedule has been received, then at step 620, the Privacy Audit Module 432 determines whether the audit schedule for the campaign is editable (i.e., can be modified). Depending on privacy laws, default policies, authority overrides, or the permission level of the user attempting to modify the audit schedule, the campaign's audit schedule might not be modifiable.

At step 625, if the audit schedule is modifiable, then the Privacy Audit Module will allow the edit and modify the audit schedule for the campaign. If at step 620 the Privacy Audit Module determines that the audit schedule is not modifiable, in some exemplary embodiments, the user may still request permission to modify the audit schedule. For example, the Privacy Audit Module 432 can, at step 630, provide an indication that the audit schedule is not editable, but also provide an indication to the user that the user may contact, through the system, one or more persons having the authority to grant or deny permission to modify the audit schedule for the campaign (i.e., administrators) to gain permission to edit the field. The Privacy Audit Module 432 may display an on-screen button that, when selected by the user, sends a notification (e.g., an email) to an administrator. The user can thus make a request to modify the audit schedule for the campaign in this manner.

At step 635, the Privacy Audit Module may determine whether permission has been granted by an administrator to allow a modification to the audit schedule. It may make this determination based on whether it has received input from an administrator to allow modification of the audit schedule for the campaign. If the administrator has granted permission, the Privacy Audit Module 432 at step 635 may allow the edit of the audit schedule. If at step 640, a denial of permission is received from the administrator, or if a certain amount of time has passed (which may be customized or based on a default setting), the Privacy Audit Module 432 retains the audit schedule for the campaign by not allowing any modifications to the schedule, and the process may proceed to step 645. The Privacy Audit Module may also send a reminder to the administrator that a request to modify the audit schedule for a campaign is pending.

At step 645, the Privacy Audit Module 432 determines whether a threshold amount of time (e.g., number of days) until the audit has been reached. This threshold may be a default value, or a customized value. If the threshold amount of time until an audit has been reached, the Privacy Audit Module 432 may at step 650 generate an electronic alert. The alert can be a message displayed to the collaborator the next time the collaborator logs into the system, or the alert can be an electronic message sent to one or more collaborators, including the campaign owners. The alert can be, for example, an email, an instant message, a text message, or one or more of these communication modalities. For example, the message may state, "This is a notification that a privacy audit for Campaign Internet Browsing History is scheduled to occur in 90 days." More than one threshold may be assigned, so that the owner of the campaign receives more than one alert as the scheduled privacy audit deadline approaches. If the threshold number of days has not been reached, the Privacy Audit Module 432 will continue to evaluate whether the threshold has been reached (i.e., back to step 645).

In exemplary embodiments, after notifying the owner of the campaign of an impending privacy audit, the Privacy Audit Module may determine at step 655 whether it has received any indication or confirmation that the privacy audit has been completed. In example embodiments, the Privacy Audit Module allows for evidence of completion to be submitted, and if sufficient, the Privacy Audit Module 432 at step 660 resets the counter for the audit schedule for the campaign. For example, a privacy audit may be confirmed upon completion of required electronic forms in which one or more collaborators verify that their respective portions of the audit process have been completed. Additionally, users can submit photos, screen shots, or other documentation that show that the organization is complying with that user's assigned portion of the privacy campaign. For example, a database administrator may take a screen shot showing that all personal data from the privacy campaign is being stored in the proper database and submit that to the system to document compliance with the terms of the campaign.

If, at step 655, no indication of completion of the audit has been received, the Privacy Audit Module 432 can determine at step 665 whether an audit for a campaign is overdue (i.e., expired). If it is not overdue, the Privacy Audit Module 432 will continue to wait for evidence of completion (e.g., step 655). If the audit is overdue, the Privacy Audit Module 432 at step 670 generates an electronic alert (e.g., an email, instant message, or text message) to the campaign owner(s) or other administrators indicating that the privacy audit is overdue, so that the organization can take responsive or remedial measures.

In exemplary embodiments, the Privacy Audit Module 432 may also receive an indication that a privacy audit has begun (not shown), so that the status of the audit when displayed on inventory page 1700 shows the status of the audit as pending. While the audit process is pending, the Privacy Audit Module 432 may be operable to generate reminders to be sent to the campaign owner(s), for example, to remind the owner of the deadline for completing the audit.

E. Template Storage and Distribution Module

The system 110 may be operable to store, in memory, one or more completed or uncompleted templates that may include, for example, privacy audit results. In particular embodiments, the templates are accessible (e.g., via a computer network such as the Internet) via a central community portal from which customers can select templates to associate with their respective customer accounts.

I. Storage, Display and Access to Templates

In various embodiments, the Template Storage and Distribution Module digitally stores templates as sets of digital data in an electronic repository. As noted above, in various embodiments, each template may include a respective set of questions and, optionally, corresponding answers to the questions. In cases where the template has been completed (e.g., answers have been provided to the template's questions and associated with the template), in particular embodiments, the answers may have been audited (e.g., by a third-party compliance assessor) to determine whether the vendor and/or the vendor's services or products (which were covered by the template's questions) comply with one or more particular privacy standards and/or laws.

In various embodiments, the system includes a graphical user interface (e.g., a central community portal) that displays one or more templates as a plurality of visual representations (e.g., suitable icons, tiles, and/or folders). A subset of the templates may be displayed in response to the system receiving a command from a customer to display the templates based on the classification of the product (e.g., software product), or service that is covered by the template. For example, the system may receive a command from a customer to display only templates for CRM software applications or HR software applications. In particular embodiments, the system is adapted to allow a customer to acquire rights to use one or more of the templates by selecting a displayed template. After the customer selects a particular template, the system makes the template electronically available to the customer, for example, by associating the template with an account of the customer. The system may allow the customer to view the particular templates associated with the customer's account.

II. Exemplary Process Performed by Template Storage and Distribution Module

FIG. 700 shows a block diagram depicting an example data processing method for the creation and access of the templates described above. The method may be performed by one or more software modules of the system 100, for example, by the Template Storage and Distribution Module. The process begins at block 705. Next, at step 710, the system digitally stores a plurality of templates in the system's memory (e.g., storage 130). As noted above, each template comprises a plurality of questions (and optionally corresponding answers) that may, for example, relate to the compliance of a particular vendor, product, or service with one or more privacy standards or privacy laws (e.g., ISO27001, NIST, SOC I, SOC Type II).

Before the templates are stored in the system, any suitable user may create a particular template (e.g., either within the system or outside the system), by assembling a set of questions to be used within the template. In particular embodiments, for example, the system comprises an appropriate user interface that allows a user (e.g., a particular vendor, customer, privacy officer, compliance assessor, or any other suitable user) to create a listing of questions to include in a particular template. As a particular example, a user may create a particular template that includes a plurality of questions that are included in a particular privacy standard (e.g., ISO27001). Examples of such questions include, "Does the vendor have an encryption policy on their laptops?", "Does the vendor have a clean desk policy so that there are not printouts of customer information on their desk", "Does the vendor have a chief information security officer that reports to a lawyer?", and/or other questions that may be appropriate based on the privacy standard or privacy law for which an audit is being conducted for compliance. The user may then save the template within the system's memory. One or more users (e.g., one or more representatives of a particular vendor) may then, via a suitable system interface, input respective answers to each of the template's various questions. As noted above, the system may store the completed or uncompleted templates in the system's memory for later use.

Once a completed template has been saved to the system's memory, a third-party compliance assessor may optionally use the completed template to conduct an audit of the vendor, service, or product that is the subject of the template. This may be advantageous, for example, because it may allow the system to provide customers of a particular vendor, or consumers of a particular product or service to conduct a privacy assessment of the vendor, service, or product without have to conduct a separate audit of the vendor, service, or product. In particular embodiments, the system may be adapted to facilitate periodic updated audits of one or more specified templates within the system. An updated audit may involve, for example: (1) having an appropriate party (e.g., a particular vendor) review the questions within the particular template and either confirm that the current answers, that are stored within the system's memory, are still correct, or provide correct answers to those questions; and (2) having an auditing service re-audit the templates' questions and answers. In particular embodiments, the system may be adapted to only arrange for a re-audit of a particular template in response to determining that one or more answers to questions within the template have changed. Similarly, a re-audit of a particular template may be limited to any questions within the template with recently updated (e.g., changed) answers.

Accordingly, it should be understood that vendors may subscribe to a predetermined standardized assessment format. A third-party privacy policy compliance assessor, on a schedule, may (e.g., periodically) complete the assessment of a particular vendor, product, or service based on the responses it provided in a completed template for the vendor, product or service. After a particular template has been audited, the template may be distributed to customers of the vendor or consumers of the product or service at issue. As a result, a vendor can create and make available a template for its numerous customers, thus eliminating the need for each customer to contact the vendor every time the customer conducts an evaluation or assessment involving the vendor's software. (In some embodiments, templates may not be audited before distribution to customers.)

At step 715, visual representations of one or more of the templates are displayed by the system—for example, presented in a graphical user interface. The visual representations may be, for example, icons, tiles, filenames, folders, images, and the like. For example, each template for a particular vendor (e.g., SalesForce) can be displayed as a tile with the label "SalesForce" on it. The visual representations may be displayed when the customer accesses the system 100 via, for example, a central community portal for accessing privacy audit results for third-party vendor software.

At step 720, the system may make a determination as to whether a user has requested to filter the templates based upon one or more criteria, such as the classification of a product (e.g., vendor software) covered by the template. That is, the system may determine whether the customer has requested to only display a subset of a larger set of templates, for example, only templates that are available for a particular type of software. Each template may have associated with it a data element relating to a classification of the vendor, product, or service to which each template relates. This data element can be used to determine which visual representations to display. The result is that a user can choose to display, for example, all the templates that are classified as customer relationship management (CRM) software, or all templates that are classified as covering accounting firms. At step 725, if the user has chosen to display a subset of the templates, the system 100, can display an appropriate subset of the templates to the user.

At steps 730 and 735, the system may determine whether a customer has chosen to edit an existing template (e.g., one of the displayed templates) or create a new template. The system 100 may provide for options to creating new templates or edit existing templates. These options may be presented concurrently with the display of templates when the customer accesses the central community portal. If, at steps 730 and 735, a customer has chosen to either create a new template or modify an existing one, the system 100 may facilitate the user creating a new template (e.g., as described above) and/or the user's modification of an existing template and, optionally, at step 735 submit the new or edited template for review and/or auditing. That is, the new or edited template may be reviewed by the proprietors of the system 100, and/or suitable compliance assessors before being digitally stored in the system as a new template (step 710) that is to be provided to other users on the central community portal.

At step 740, the system 100 determines whether the system has received input from a customer indicating a desire to obtain or acquire rights to use one or more of the templates. If the customer has provided no such input, the system continues to display the visual representations of the templates until the user makes such selections or advances to a different user interface.

If the customer selects a template then, at step 745, the system 100 may make the template available for access by the customer. In particular, the system may, for example, associate the template with an account of the customer for future use. The customer may later select the template using any method known to those of ordinary skill in the field, including by clicking on an indicia representing the template, using checkbox inputs, or any other suitable method. The system 100 may also, or alternatively, provide access to a particular template by allowing the customer to download the template and store it within a repository associated with the customer, which may be local or networked.

Once a customer has obtained the right to access one or more templates, the customer can view the templates that are available and/or associated with the customer's account, and also—as discussed in greater detail below—associate the appropriate template with a specific privacy campaign in which the subject of the application is used (e.g., a privacy campaign that uses a particular software application that is covered by a completed and audited template).

F. Audit Results and Customer Implementation Module

The system may include an Audit Results and Customer Implementation Module that is adapted to allow customers to associate particular templates with particular privacy campaigns as discussed above. This module may also allow customers to customize templates to reflect how the customer will interact with and/or deploy the subject of the template. For example, when executing the module, the system may present the customer with questions as to how they intend to implement a particular software application that is the subject of the template, and then save the questions and corresponding answers as part of the completed template.

A default risk assessment rating and/or weight may be included for each question/answer pairing within a particular template. However, in various embodiments, the system may be adapted to allow the customer to assign (e.g., by electronic entry) a customized relative risk rating and/or weighting factor to each question/answer pairing that the customer chooses to include. As discussed above, these risk ratings and weighting factors may be used by the system in calculating an aggregated risk score for the privacy campaign.

I. Example Process Performed by Audit Results and Customer Implementation Module Figure 800 shows a block diagram depicting an example data processing method for associating the question/answer pairings of a template with a particular privacy campaign, and for entry of privacy-related questions and answers regarding a customer-specific implementation of a particular vendor's products or services. This method may be performed, for example, by an Audit Results and Customer Implementation Module. The method begins at step 805.

At 810, the system may receive a customer command to add a privacy campaign. A customer may add a campaign, for example, using the customer interfaces shown in FIGS. 10-15. If, during entry of campaign data, the system identifies a third-party product or service that is the subject of a template stored within the system (e.g., FIG. 14, 1220, "Acme System or 3rd Party System?"), the system 100 may, in response, provide the customer user with the opportunity to download a completed template related to that third-party product or service. As noted above, the system may also provide the user with the option to provide privacy audit-related responses to questions regarding the customer's implementation of the third-party product or service. These questions and corresponding answers are then stored in the system's memory for later use in auditing the privacy campaign.

At step 815, the system receives an electronic selection by a customer indicating a desire to associate, with the privacy campaign, a template related to a vendor, product or service provided by a third-party to the customer.

At step 820, the system associates a completed template selected by the customer with the privacy campaign, and then at step 825, the system stores the completed template as an electronic record associated with the privacy campaign.

Once the template is associated with the privacy campaign, the customer may determine which audit results from the template to formally associate with the privacy campaign. At step 830, the system displays various audit results from within the template on a graphical user interface using one or more visual indicators, such as text, or suitable one or more icons, tiles, folders, etc. Each audit result may include one or more question/answer pairings related to one or more aspects of the vendor's subject product or service. For example, one set of audit results may include multiple question/answer pairings related to the vendor's laptop encryption policy. Another set of question/answer pairings may include questions and corresponding answers related to a vendor's process for conducting privacy reviews. Another set of prompts and responses may relate to the vendor's use of third party penetration tests to assess potential vulnerabilities in the vendor's computer systems. At step 835, the system 100 may receive a request from the customer to filter the visual indicators displayed, such that the system only displays a subset of the audit results (e.g., a specified subset of question/answer pairings) from within the template.

In various embodiments, the system 100 may be operative to store a respective data element (e.g., metadata) regarding one or more privacy assessment standards (e.g., ISO27001, NIST, SOC I, SOC II Type 2, etc.) to which each of the one or more question/answer pairings within a particular template relates. When a vendor, proprietor of the system 100, or some other contributor submits questions and answers for use in a template, the system may prompt the user to input what kind of assessment standard (or the name of the assessment standard) to which the questions and answers relate. This information may be used to populate the data elements.

Later, the system may use the respective data elements to digitally determine which question/answer pairings of the template to display, based, for example, on a customer's selection of a particular assessment standard. At step 840, the system displays question/answer pairings based upon the customer's selection of one or more assessment standards if the customer has chosen such a filter. If the customer does not choose to apply a filter to the contents of the template, then the system may simply display all the question/answer pairings associated with the template and the user may manually select any question/answer pairings (or groups of question/answer pairings) to associate with the campaign.

At 845, the system 100 receives a customer selection to associate selected question/answer pairings with the privacy campaign. The system 100 may display a selector associated with each question/answer pairing that allows a customer to choose whether to associate particular question/answer pairings with the privacy campaign. Examples of selectors may include, for example, a check box, a radial selector, or any other method used for selecting items on a graphical user interface. While certain question/answer pairings of the template may be associated with the privacy campaign based upon the user's selection, the full template related to the relevant vendor, product or service may still associated with the campaign. In such embodiments, if the customer implements a different particular privacy standard in the future, the customer may select the same template, display the question/answer pairings of that template, and select new question/answer pairings related to the new standard for association with the campaign.

At step 850, the system 100 may optionally receive, from a user, a relative risk rating and/or a weighting factor for one or more of the question/answer pairings that the customer has selected from the template for association with the campaign. In particular embodiments, if the customer doesn't assign a custom relative risk rating and/or weighting factor for a particular question/answer pairing, the system may use a default relative risk rating and/or weighting factor for each question/answer pairing in suitable calculations.

At step 855, the system may use the relative risk ratings and weighting factors for the various question/answer pairings to calculate risk as described above in relation to FIG. 5, so that an aggregated risk score for the vendor, product, or service can be determined by the system.

At step 860, the system 100 collects privacy information related to the user's specific implementation of the vendor's software. Prior to this point, in various embodiments, the question/answer pairings having questions and answers (i.e., prompts and responses) will have been derived from a template and associated with the privacy campaign at issue. Such questions and answers are typically of the type that would have the same answer for every customer of the vendor, product or service at issue. At step 860, the system 100 presents a customer with prompts for information regarding the customer's specific interaction with the vendor, product or service associated with the privacy campaign. The prompts might relate to, for example, which features of a particular piece of software the customer plans to implement. Example questions might be: "Is the email marketing feature being used?" or "Are real time email alerts turned on?" These are questions that the vendor cannot answer globally for all of their customers. The system may present the prompts in a step-by-step fashion (i.e., using a "wizard").

At step 865, the system 100 accepts responses to the prompts for information regarding the customer's implementation and stores the responses in association with the privacy campaign. To allow for more customization, in various embodiments, the system is adapted to allow a customer to add any additional questions and answers that the customer believes should be added.

At step 870, the customer may assign relative risk ratings and/or weighting factors for each question/answer pairing provided outside of the context of the template.

At step 875, the system may calculate the risk level for the privacy campaign using a variety of factors as described above in regard to FIG. 5. During this process, the system may, for example, rely on the relative risk rating and weighting factors for each question/answer pairing from the template as well as for the question/answer pairings that are specific to the customer's specific implementation.

Thus, for example, in FIG. 5, the system may list another category of factors prior to step 535. As mentioned previously, the risk level for a particular campaign may be reflected on an inventory page, wherein the inventory page displays a listing of a plurality of campaigns and associated visual indicators that relate to the risk level for each listed campaign. The system may calculate this risk level based at least in part on question/answer pairings from the templates, as well as the question/answer pairings related to the customer's implementation. In this manner, the system may be operable to flag and/or otherwise account for any assessments, projects, campaigns, and/or data flows that the organization has documented and maintained within the system if those data flows are associated with a vendor that has its rating changed so that the rating fails to meet pre-determined criteria (e.g., if the vendor's rating falls below a predetermined threshold).

G. Template Update Module

In various embodiments, the system 100 includes a Template Update Module that facilitates the updating of templates by a suitable party, such as a vendor, and the distribution of updated templates to customers that subscribe to updates of the template. The Template Update Module also determines whether an update to a particular vendor template is overdue, and takes remedial measures if a template update is overdue. The operation of a Template Update Module according to particular embodiments is described below.

I. Customer Subscription to Vendor Updates

In particular embodiments, the Template Update Module allows for the updating of privacy question/answer pairings within templates associated with respective vendors, products, or services. In particular embodiments, the module receives a selection by a customer to receive updates to a particular template, or multiple templates, that are associated with the user's account. After receiving such a selection for a particular template, if an update to the template has occurred, the system associates the updated version of the template with the customer's account. The system also informs the customer that the template has been updated. If the customer has not elected to receive updates for the particular template, the system, in response to the template being updated, may inform the customer that an update is available.

In various embodiments, the Template Update Module is adapted to facilitate the updating of templates within the system. For example, in particular embodiments, after particular templates are stored within the system, the module may determine, on a periodic basis, whether an update to any of particular template is overdue. If an update is overdue, the system may respond by taking an appropriate remedial measure.

II. Example Process Performed by Template Update Module

Figure 9:
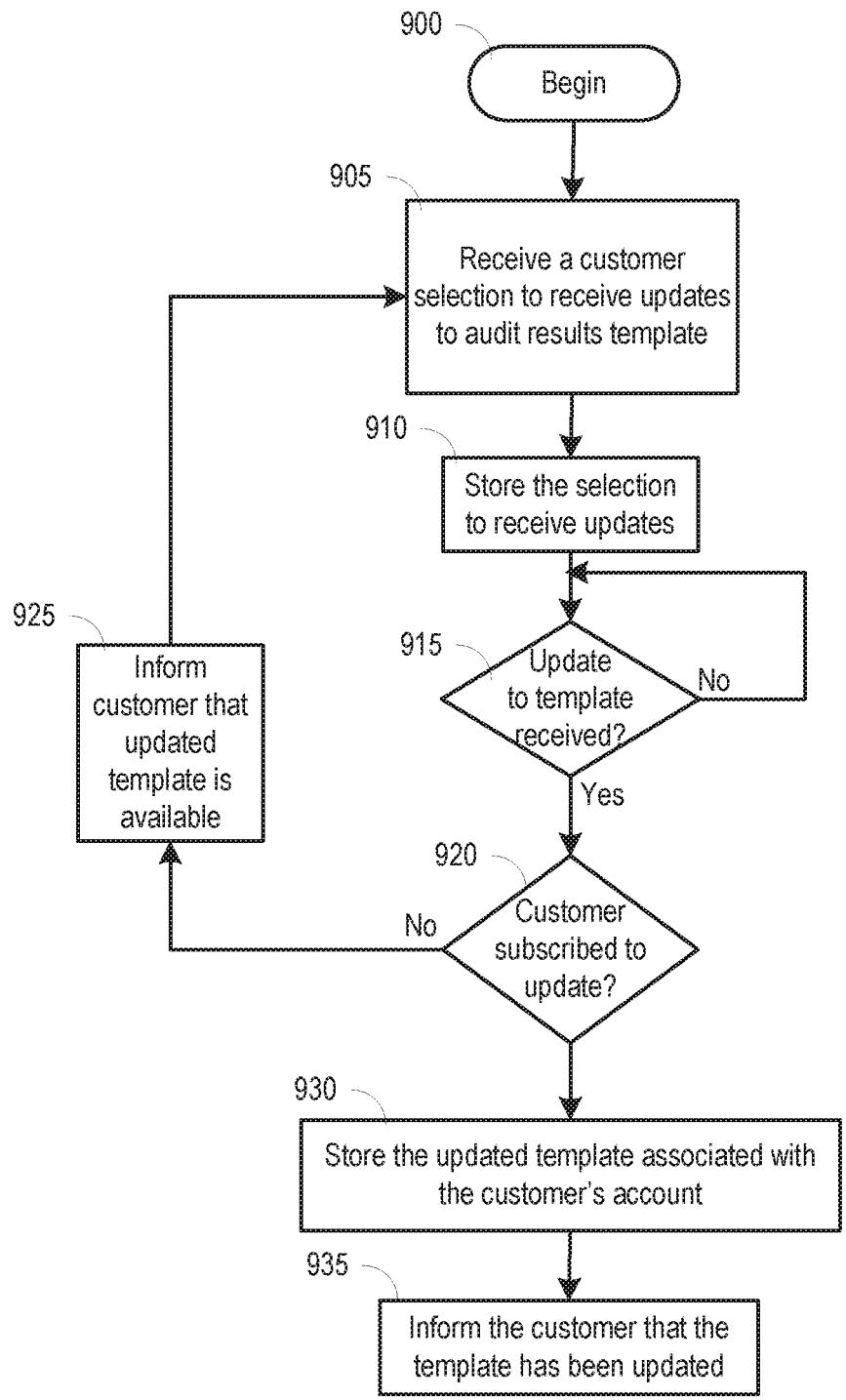
FIG. 9 is a flow chart showing an example of a process performed by the Template Update Module.

FIG. 9 is a flow chart illustrating an example method that may be performed by various embodiments of the system 100 to update a particular template associated with a customer's account. The method may be performed by a Template Update Module. The method begins at 900. At 905, the system 100 receives a selection by a customer to receive updates to a template, wherein the template relates to a particular vendor, product or service, and the questions and respective answers relate to, for example, the compliance with one or more privacy assessment standards. The selection may be made, for example, using the update selector 2035 in the interface shown in FIG. 20. At step 910, the selection made by the customer to receive updates is digitally stored, for example, in storage (e.g., computer memory) 130. It may be stored, for example, as a data element. The system then monitors the template for updates.

At step 915, the system 100 may determine whether an update to the template has occurred. Updates to the template may have originated, for example, from a particular vendor, a manufacturer of a particular product, or any other suitable party. As mentioned, the templates and, in particular, the question/answer pairings within particular templates, may, in various circumstances, be periodically audited by a third-party auditing firm. If any changes are needed to comply with one or more particular privacy standards, the third party may use the system 100 to initiate an alert to the appropriate party to modify the product, service, or business practices at issue, and to update the template to reflect the change. In other circumstances, an appropriate third party may modify a particular template to reflect changes that have occurred (e.g., to a particular product, service, or vendor business practices) outside of the context of a privacy audit.

In various embodiments, the system 100 may be operable to modify a risk rating associated with a vendor, product or service, if a template associated with the vendor, product, or service is not being updated frequently enough, or if one or more portions of a particular template falls out of compliance with one or more assessment standards. In various embodiments, the system may be adapted to send an alert to any customers that have a particular template associated with their account if a vendor, product, or service that is the subject of the template has its risk rating exceed a particular predetermined level (which may occur, for example, if one or more answers within the template have changed, or if the template has not been updated according to a particular schedule).

Returning to step 915, if no update has been received, the system 100 may remain in a state in which it awaits reception of an update of the template. At step 920, in response to the system receiving an update to the template, the system 100 determines whether the customer elected to receive updates to the template when they are available. If the customer has not elected to receive such updates, at step 925, the system may optionally send an alert to the customer indicating that an updated template is available. The alert may be, for example, an electronic message in the form of an email or an instant message, and can be generated by the communications module. The message may also inform the customer that outdated templates may not reflect the current state of a vendor, product, or service. The message may also, or alternatively, inform the customer that the relevant vendor, product, or service has become complaint with, or has fallen out of compliance with, one or more privacy standards or laws.

If it is determined that the customer has subscribed to updates for the template then, at step 930, the system 100 associates an updated version of the template with the customer's account. In various embodiment, the previous template may be stored as an archive, or the template may simply be replaced.

At step 935, the system may inform the customer that the template has been updated and optionally, provide the user with the option to modify or add one or more risk ratings and/or rating factors associated with one or more of the question/answer pairings within the template.

H. Communications Module

In exemplary embodiments, a Communications Module of the System 100 may facilitate the communications between various owners and personnel related to a privacy campaign. The Communications Module may retain contact information (e.g., emails or instant messaging contact information) input by campaign owners and other collaborators. The Communications Module can be operable to take a generated notification or alert (e.g., alert in step 670 generated by Privacy Audit Module 432) and instantiate an email containing the relevant information. As mentioned above, the Main Privacy Compliance Module 400 may, for example through a communications module, be operable to send collaborators emails regarding their assignment of one or more portions of inputs to campaign data. Or through the communications module, selecting the commentators button brings up one or more collaborators that are on-line In exemplary embodiments, the Communications Module can also, in response to a user request (e.g., depressing the "comment" button show in FIG. 11, FIG. 12, FIG. 13, FIG. 14, FIG. 15, FIG. 16), instantiate an instant messaging session and overlay the instant messaging session over one or more portions of a GUI, including a GUI in which a user is presented with prompts to enter or select information. An example of this instant messaging overlay feature orchestrated by the Communications Module is shown in FIG. 17. While a real-time message session may be generated, off-line users may still able to see the messages when they are back on-line.

The Communications Module may facilitate the generation of alerts that indicate that one or more emails or instant messages await a collaborator.

If campaign data inputs have been assigned to one or more collaborators, but those collaborators have not input the data yet, the Communications Module, may facilitate the sending of an electronic message (such as an email) alerting the collaborators and owners that they have not yet supplied their designated portion of campaign data.

I. Historical Record Keeping Module

The system 100 also includes a Historical Record Keeping Module, wherein every answer, change to answer, as well as assignment/re-assignment of owners and collaborators is logged for historical record keeping.

Exemplary User Experience

In the exemplary embodiments of the system for operationalizing privacy compliance, adding a campaign (i.e., data flow) comprises gathering information that includes several phases: (1) a description of the campaign; (2) the personal data to be collected as part of the campaign; (3) who the personal data relates to; (4) where the personal data be stored; and (5) who will have access to the indicated personal data.

A. FIG. 10: Campaign Record Creation and Collaborator Assignment

FIG. 10 illustrates an example of the first phase of information gathering to add a campaign. In FIG. 10, a description entry dialog 1000 may have several fillable/editable fields and drop-down selectors. In this example, the user may fill out the name of the campaign in the Short Summary (name) field 1005, and a description of the campaign in the Description field 1010. The user may enter or select the name of the business group (or groups) that will be accessing personal data for the campaign in the Business Group field 1015. The user may select the primary business representative responsible for the campaign (i.e., the campaign's owner), and designate him/herself, or designate someone else to be that owner by entering that selection through the Someone Else field 1020. Similarly, the user may designate him/herself as the privacy office representative owner for the campaign, or select someone else from the second Someone Else field 1025. At any point, a user assigned as the owner may also assign others the task of selecting or answering any question related to the campaign.

The user may also enter one or more tag words associated with the campaign in the Tags field 1030. After entry, the tag words may be used to search for campaigns, or used to filter for campaigns (for example, under Filters 1045). The user may assign a due date for completing the campaign entry, and turn reminders for the campaign on or off. The user may save and continue, or assign and close.

In example embodiments, some of the fields may be filled in by a user, with suggest-as-you-type display of possible field entries (e.g., Business Group field 1015), and/or may include the ability for the user to select items from a drop-down selector (e.g., drop-down selectors 1040*a*, 1040*b*, 1040*c*). The system may also allow some fields to stay hidden or unmodifiable to certain designated viewers or categories of users. For example, the purpose behind a campaign may be hidden from anyone who is not the chief privacy officer of the company, or the retention schedule may be configured so that it cannot be modified by anyone outside of the organization's' legal department.

Figure 11:
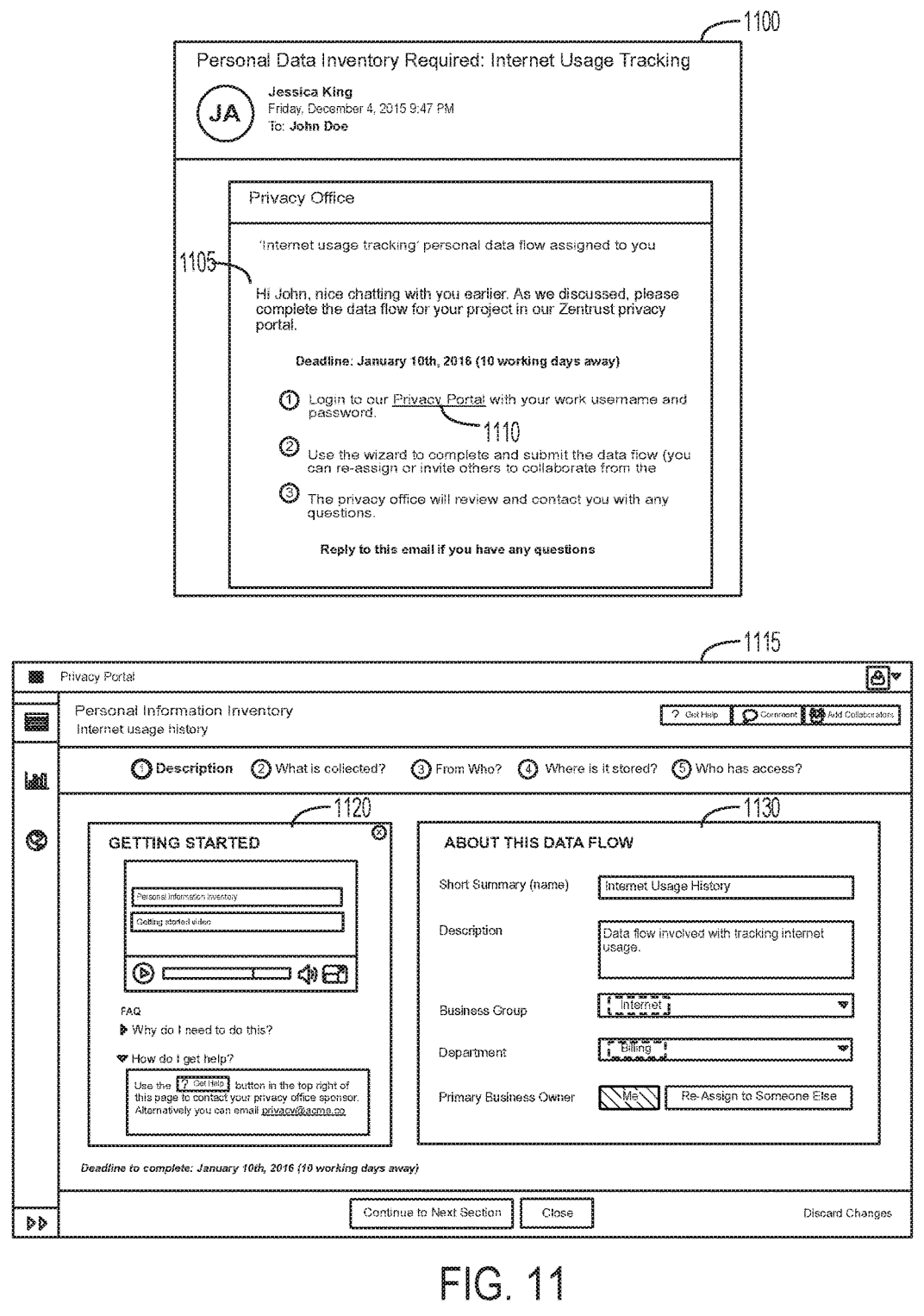

B. FIG. 11: Collaborator Assignment Notification and Description Entry

Moving to FIG. 11, in example embodiments, if another business representative (owner), or another privacy office representative has been assigned to the campaign (e.g., John Doe in FIG. 10), the system may send a notification (e.g., an electronic notification) to the assigned individual, letting them know that the campaign has been assigned to him/her. FIG. 11 shows an example notification 1100 sent to John Doe that is in the form of an email message. The email informs him that the campaign "Internet Usage Tracking" has been assigned to him, and provides other relevant information, including the deadline for completing the campaign entry and instructions to log in to the system to complete the campaign (data flow) entry (which may be done, for example, using a suitable "wizard" program). The user that assigned John ownership of the campaign may also include additional comments 1105 to be included with the notification 1100. Also included may be an option to reply to the email if an assigned owner has any questions.

In this example, if John selects the hyperlink Privacy Portal 1110, he is able to access the system, which displays a landing page 1115. The landing page 1115 displays a Getting Started section 1120 to familiarize new owners with the system, and also display an "About This Data Flow" section 1130 showing overview information for the campaign.

Figure 12:
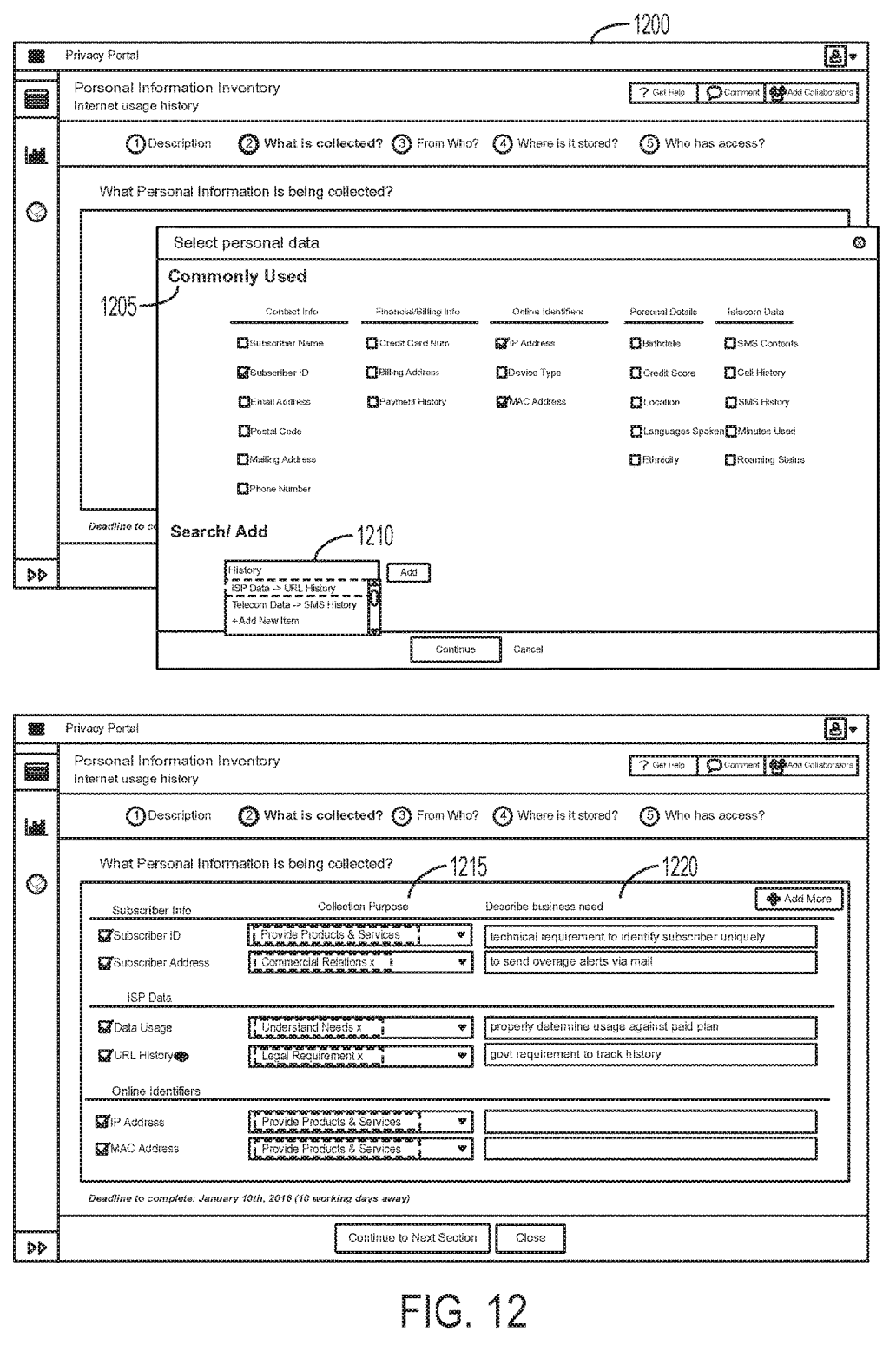

C. FIG. 12: What Personal Data is Collected

Moving to FIG. 12, after the first phase of campaign addition (i.e., description entry phase), the system may present the user (who may be a subsequently assigned business representative or privacy officer) with a dialog 1200 from which the user may enter in the type of personal data being collected.

In addition, questions are described generally as transitional questions, but the questions may also include one or more smart questions in which the system is configured to: (1) pose an initial question to a user and, (2) in response to the user's answer satisfying certain criteria, presenting the user with one or more follow-up questions. For example, in FIG. 12, if the user responds with a choice to add personal data, the user may be additionally presented follow-up prompts, for example, the select personal data window overlaying screen 1000 that includes commonly used selections may include, for example, particular elements of an individual's contact information (e.g., name, address, email address), Financial/Billing Information (e.g., credit card number, billing address, bank account number), Online Identifiers (e.g., IP Address, device type, MAC Address), Personal Details (Birthdate, Credit Score, Location), or Telecommunication Data (e.g., Call History, SMS History, Roaming Status). The System 100 is also operable to pre-select or automatically populate choices—for example, with commonly-used selections 1205, some of the boxes may already be checked. The user may also use a search/add tool 1210 to search for other selections that are not commonly used and add another selection. Based on the selections made, the user may be presented with more options and fields. For example, if the user selected "Subscriber ID" as personal data associated with the campaign, the user may be prompted to add a collection purpose under the heading Collection Purpose 1215, and the user may be prompted to provide the business reason why a Subscriber ID is being collected under the "Describe Business Need" heading 1220.

Figure 13:
FIG. 13 is an example of a GUI that shows a dialog that allows collection of campaign data regarding the subject from whom the personal data was collected.

D. FIG. 13: Who Personal Data is Collected From

As displayed in the example of FIG. 13, the third phase of adding a campaign may relate to entering and selecting information regarding who the personal data is gathered from. As noted above, the personal data may be gathered from, for example, one or more Subjects 300. In the exemplary "Collected From" dialog 1300, a user may be presented with several selections in the "Who Is It Collected From" section 1305. These selections may include whether the personal data was to be collected from an employee, customer, or other entity. Any entities that are not stored in the system may be added. The selections may also include, for example, whether the data was collected from a current or prospective subject (e.g., a prospective employee may have filled out an employment application with his/her social security number on it). Additionally, the selections may include how consent was given, for example through an end user license agreement (EULA), on-line Opt-in prompt, Implied consent, or an indication that the user is not sure. Additional selections may include whether the personal data was collected from a minor, and where the subject is located.

Figure 14:
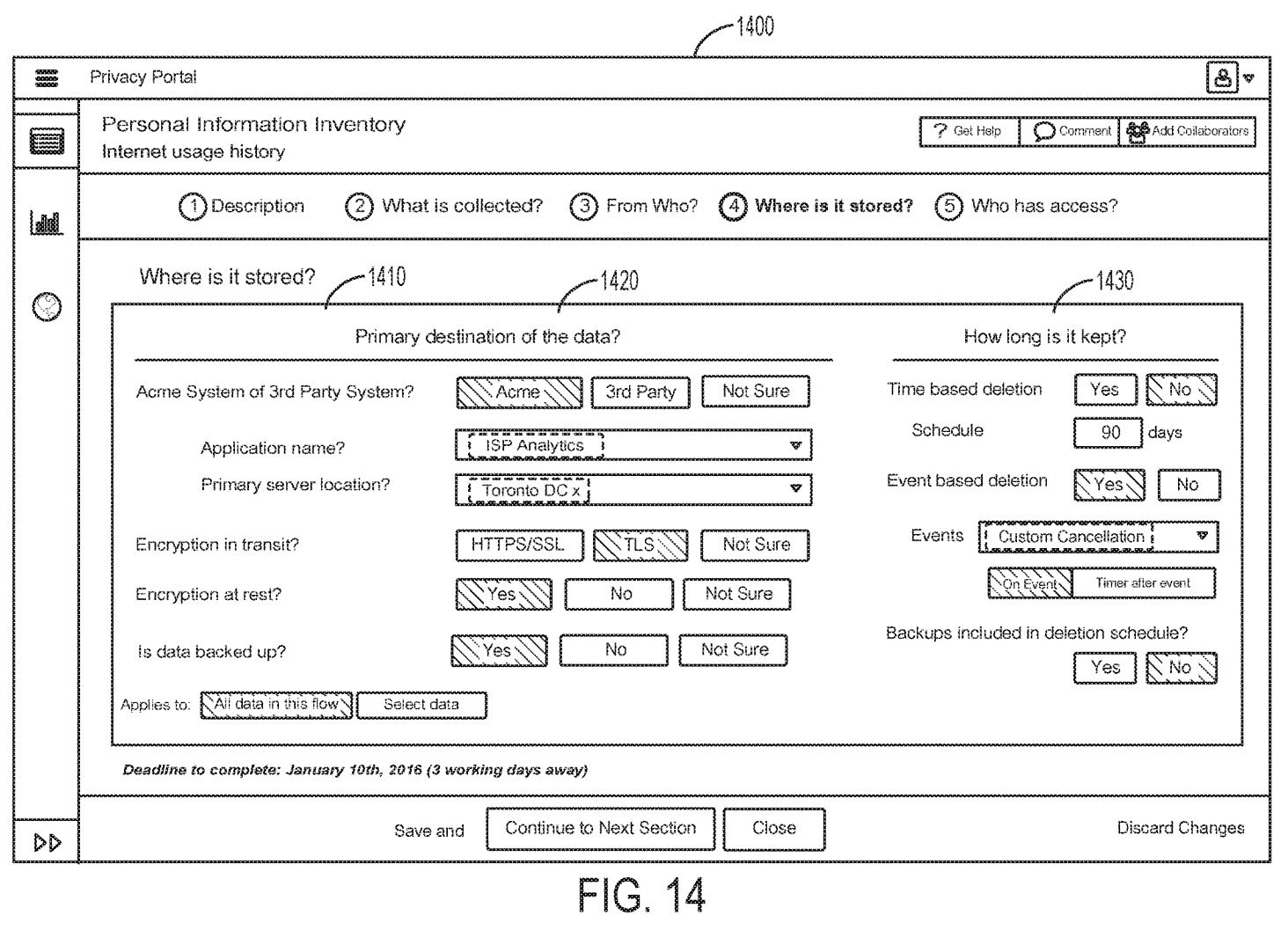

E. FIG. 14: Where is the Personal Data Stored

FIG. 14 shows an example "Storage Entry" dialog screen 1400, which is a graphical user interface that a user may use to indicate where particular sensitive information is to be stored within the system. From this section, a user may specify, in this case for the Internet Usage History campaign, the primary destination of the personal data 1420 and how long the personal data is to be kept 1430. The personal data may be housed by the organization (in this example, an entity called "Acme") or a third party. The user may specify an application associated with the personal data's storage (in this example, ISP Analytics), and may also specify the location of computing systems (e.g., servers) that will be storing the personal data (e.g., a Toronto data center). Other selections indicate whether the data will be encrypted and/or backed up.

The system also allows the user to select whether the destination settings are applicable to all the personal data of the campaign, or just select data (and if so, which data). In FIG. 14, the user may also select and input options related to the retention of the personal data collected for the campaign (e.g., How Long Is It Kept 1430). The retention options may indicate, for example, that the campaign's personal data should be deleted after a per-determined period of time has passed (e.g., on a particular date), or that the campaign's personal data should be deleted in accordance with the occurrence of one or more specified events (e.g., in response to the occurrence of a particular event, or after a specified period of time passes after the occurrence of a particular event), and the user may also select whether backups should be accounted for in any retention schedule. For example, the user may specify that any backups of the personal data should be deleted (or, alternatively, retained) when the primary copy of the personal data is deleted.

Figure 15:
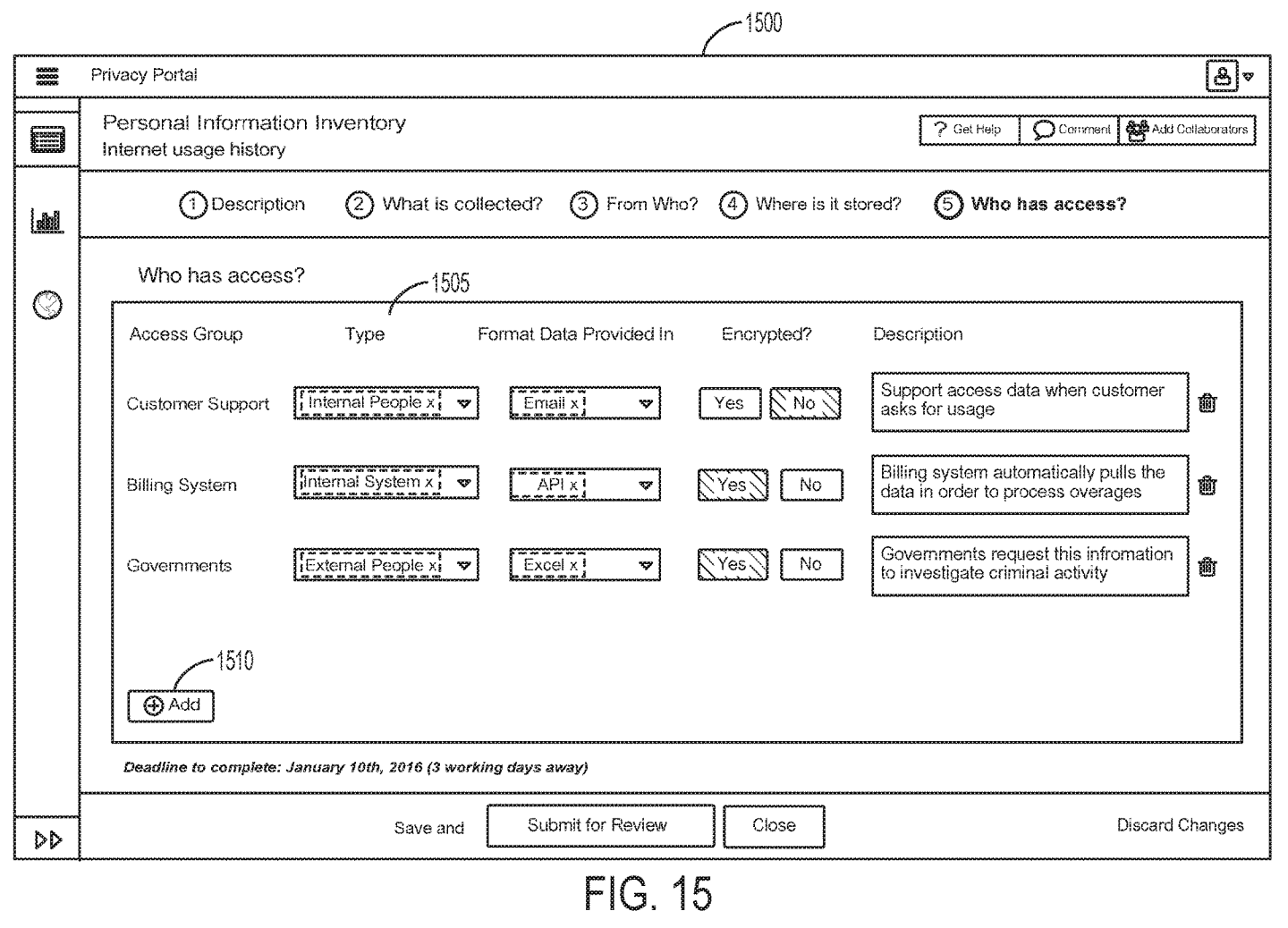

F. FIG. 15: Who and What Systems Have Access to Personal Data

FIG. 15 describes an example Access entry dialog screen 1500. As part of the process of adding a campaign or data flow, the user may specify in the "Who Has Access" section 1505 of the dialog screen 1500. In the example shown, the Customer Support, Billing, and Government groups within the organization are able to access the Internet Usage History personal data collected by the organization. Within each of these access groups, the user may select the type of each group, the format in which the personal data was provided, and whether the personal data is encrypted. The access level of each group may also be entered. The user may add additional access groups via the Add Group button 1510.

G. Facilitating Entry of Campaign Data, Including Chat Shown in FIG. 16

As mentioned above, to facilitate the entry of data collected through the example GUIs shown in FIGS. 10 through 14, in exemplary embodiments, the system is adapted to allow the owner of a particular campaign (or other user) to assign certain sections of questions, or individual questions, related to the campaign to contributors other than the owner. This may eliminate the need for the owner to contact other users to determine information that they don't know and then enter the information into the system themselves. Rather, in various embodiments, the system facilitates the entry of the requested information directly into the system by the assigned users.

In exemplary embodiments, after the owner assigns a respective responsible party to each question or section of questions that need to be answered in order to fully populate the data flow, the system may automatically contact each user (e.g., via an appropriate electronic message) to inform the user that they have been assigned to complete the specified questions and/or sections of questions, and provide those users with instructions as to how to log into the system to enter the data. The system may also be adapted to periodically follow up with each user with reminders until the user completes the designated tasks. As discussed elsewhere herein, the system may also be adapted to facilitate real-time text or voice communications between multiple collaborators as they work together to complete the questions necessary to define the data flow. Together, these features may reduce the amount of time and effort needed to complete each data flow.

Figure 16:
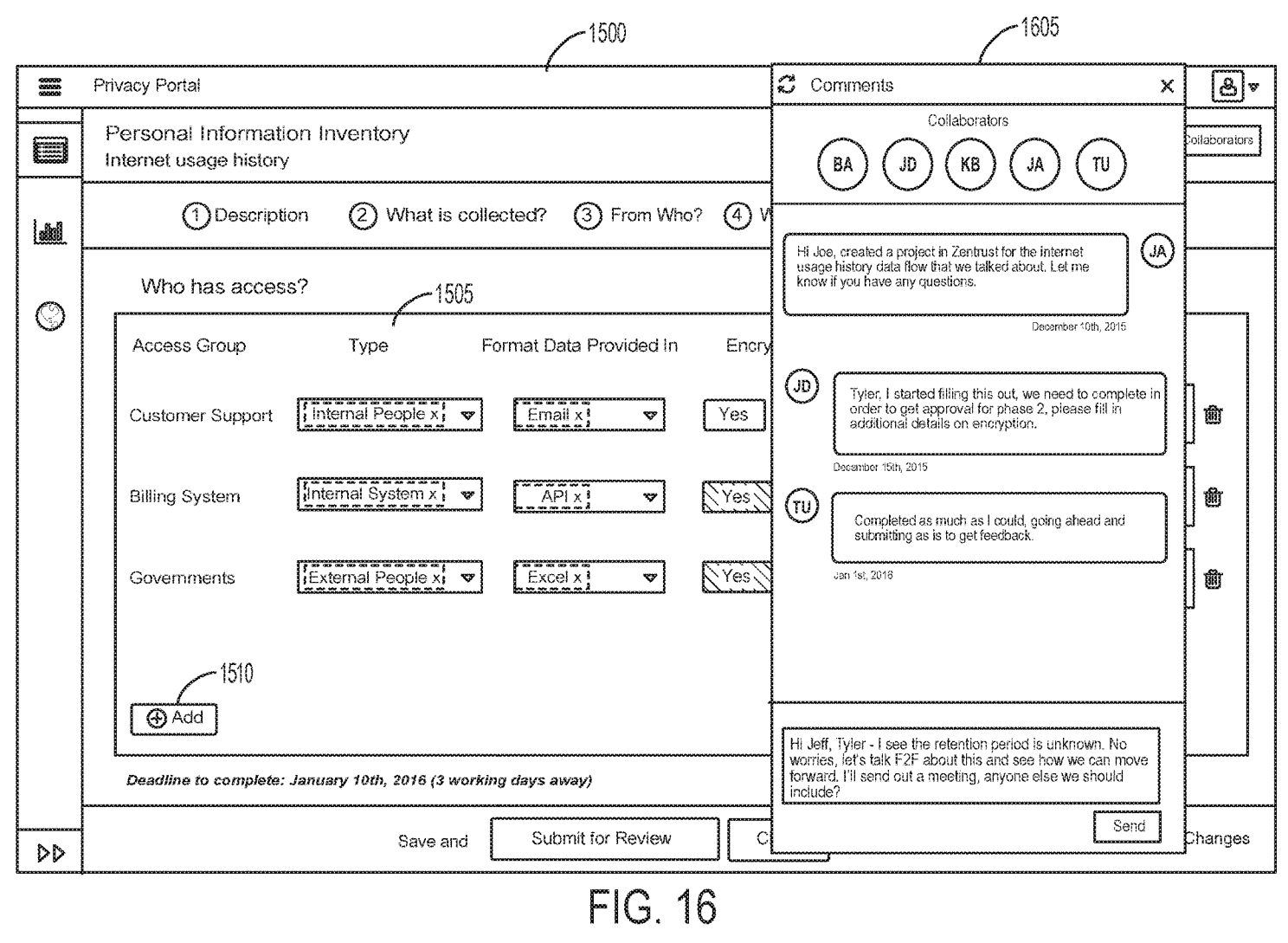

To further facilitate collaboration, as shown FIG. 16, in exemplary embodiments, the System 100 is operable to overlay an instant messaging session over a GUI in which a user is presented with prompts to enter or select information. In FIG. 16, a communications module is operable to create an instant messaging session window 1605 that overlays the Access entry dialog screen 1600. In exemplary embodiments, the Communications Module, in response to a user request (e.g., depressing the "comment" button show in FIG. 11, FIG. 12, FIG. 13, FIG. 14, FIG. 15, FIG. 16), instantiates an instant messaging session and overlays the instant messaging session over one or more portions of the GUI.

H: FIG. 17: Campaign Inventory Page

After new campaigns have been added, for example using the exemplary processes explained in regard to FIGS. 10-15, the users of the system may view their respective campaign or campaigns, depending on whether they have access to the campaign. The chief privacy officer, or another privacy office representative, for example, may be the only user that may view all campaigns. A listing of all of the campaigns within the system may be viewed on, for example, inventory page 1700 (see below). Further details regarding each campaign may be viewed via, for example, campaign information page 1600, which may be accessed by selecting a particular campaign on the inventory page 1700. And any information related to the campaign may be edited or added through, for example, the edit campaign dialog 1700 screen. Certain fields or information may not be editable, depending on the particular user's level of access. A user may also add a new campaign using a suitable user interface, such as the graphical user interface shown in FIG. 17 or FIG. 16.

In example embodiments, the System 100 (and more particularly, the Main Privacy Compliance Module 400) may use the history of past entries to suggest selections for users during campaign creation and entry of associated data. As an example, in FIG. 12, if most entries that contain the term "Internet" and have John Doe as the business rep assigned to the campaign have the items Subscriber ID, IP Address, and MAC Address selected, then the items that are commonly used may display as pre-selected items the Subscriber ID, IP address, and MAC Address each time a campaign is created having Internet in its description and John Doe as its business rep.

FIG. 17 describes an example embodiment of an inventory page 1700 that may be generated by the Main Privacy Compliance Module 400. The inventory page 1700 may be represented in a graphical user interface. Each of the graphical user interfaces (e.g., webpages, dialog boxes, etc.) presented in this application may be, in various embodiments, an HTML-based page capable of being displayed on a web browser (e.g., Firefox, Internet Explorer, Google Chrome, Opera, etc.), or any other computer-generated graphical user interface operable to display information, including information having interactive elements (e.g., an iOS, Mac OS, Android, Linux, or Microsoft Windows application). The webpage displaying the inventory page 1700 may include typical features such as a scroll-bar, menu items, as well as buttons for minimizing, maximizing, and closing the webpage. The inventory page 1700 may be accessible to the organization's chief privacy officer, or any other of the organization's personnel having the need, and/or permission, to view personal data.

Still referring to FIG. 17, inventory page 1700 may display one or more campaigns listed in the column heading Data Flow Summary 1705, as well as other information associated with each campaign, as described herein. Some of the exemplary listed campaigns include Internet Usage History 1710, Customer Payment Information, Call History Log, Cellular Roaming Records, etc. A campaign may represent, for example, a business operation that the organization is engaged in may require the use of personal data, which may include the personal data of a customer. In the campaign Internet Usage History 1710, for example, a marketing department may need customers' on-line browsing patterns to run analytics. Examples of more information that may be associated with the Internet Usage History 1710 campaign will be presented in FIG. 4 and FIG. 5. In example embodiments, clicking on (i.e., selecting) the column heading Data Flow Summary 1705 may result in the campaigns being sorted either alphabetically, or reverse alphabetically.

The inventory page 1700 may also display the status of each campaign, as indicated in column heading Status 1715. Exemplary statuses may include "Pending Review", which means the campaign has not been approved yet, "Approved," meaning the data flow associated with that campaign has been approved, "Audit Needed," which may indicate that a privacy audit of the personal data associated with the campaign is needed, and "Action Required," meaning that one or more individuals associated with the campaign must take some kind of action related to the campaign (e.g., completing missing information, responding to an outstanding message, etc.). In certain embodiments, clicking on (i.e., selecting) the column heading Status 1715 may result in the campaigns being sorted by status.

The inventory page 1700 of FIG. 17 may list the "source" from which the personal data associated with a campaign originated, under the column heading "Source" 1720. The sources may include one or more of the subjects 300 in example FIG. 3. As an example, the campaign "Internet Usage History" 1710 may include a customer's IP address or MAC address. For the example campaign "Employee Reference Checks", the source may be a particular employee. In example embodiments, clicking on (i.e., selecting) the column heading Source 1720 may result in the campaigns being sorted by source.

The inventory page 1700 of FIG. 17 may also list the "destination" of the personal data associated with a particular campaign under the column heading Destination 1725. Personal data may be stored in any of a variety of places, for example on one or more storage devices 280 that are maintained by a particular entity at a particular location. Different custodians may maintain one or more of the different storage devices. By way of example, referring to FIG. 17, the personal data associated with the Internet Usage History campaign 1710 may be stored in a repository located at the Toronto data center, and the repository may be controlled by the organization (e.g., Acme corporation) or another entity, such as a vendor of the organization that has been hired by the organization to analyze the customer's internet usage history. Alternatively, storage may be with a department within the organization (e.g., its marketing department). In example embodiments, clicking on (i.e., selecting) the column heading Destination 1725 may result in the campaigns being sorted by destination.

On the inventory page 1700, the Access heading 1730 may show the number of transfers that the personal data associated with a campaign has undergone. In example embodiments, clicking on (i.e., selecting) the column heading "Access" 1730 may result in the campaigns being sorted by Access.

The column with the heading Audit 1735 shows the status of any privacy audits associated with the campaign. Privacy audits may be pending, in which an audit has been initiated but yet to be completed. The audit column may also show for the associated campaign how many days have passed since a privacy audit was last conducted for that campaign. (e.g., 140 days, 360 days). If no audit for a campaign is currently required, an "OK" or some other type of indication of compliance (e.g., a "thumbs up" indicia) may be displayed for that campaign's audit status. Campaigns may also be sorted based on their privacy audit status by selecting or clicking on the Audit heading 1735.

In example inventory page 1700, an indicator under the heading Risk 1740 may also display an indicator as to the Risk Level associated with the personal data for a particular campaign. As described earlier, a risk assessment may be made for each campaign based on one or more factors that may be obtained by the system. The indicator may, for example, be a numerical score (e.g., Risk Level of the campaign), or, as in the example shown in FIG. 17, it may be arrows that indicate the Overall Risk Assessment for the campaign. The arrows may be of different shades, or different colors (e.g., red arrows indicating "high risk" campaigns, yellow arrows indicating "medium risk" campaigns, and green arrows indicating "low risk" campaigns). The direction of the arrows—for example, pointing upward or downward, may also provide a quick indication of Overall Risk Assessment for users viewing the inventory page 1700. Each campaign may be sorted based on the Risk Level associated with the campaign.

The example inventory page 1700 may comprise a filter tool, indicated by Filters 1745, to display only the campaigns having certain information associated with them. For example, as shown in FIG. 17, under Collection Purpose 1750, checking the boxes "Commercial Relations," "Provide Products/Services", "Understand Needs," "Develop Business & Ops," and "Legal Requirement" will result the display under the Data Flow Summary 1705 of only the campaigns that meet those selected collection purpose requirements.

From example inventory page 1700, a user may also add a campaign by selecting (i.e., clicking on) Add Data Flow 1755. Once this selection has been made, the system initiates a routine to guide the user in a phase-by-phase manner through the process of creating a new campaign (further details herein). An example of the multi-phase GUIs in which campaign data associated with the added privacy campaign may be input and associated with the privacy campaign record is described in FIG. 10-15 above.

From the example inventory page 1700, a user may view the information associated with each campaign in more depth, or edit the information associated with each campaign. To do this, the user may, for example, click on or select the name of the campaign (i.e., click on Internet Usage History 1710). As another example, the user may select a button displayed on screen indicating that the campaign data is editable (e.g., edit button 1760).

Figure 18:
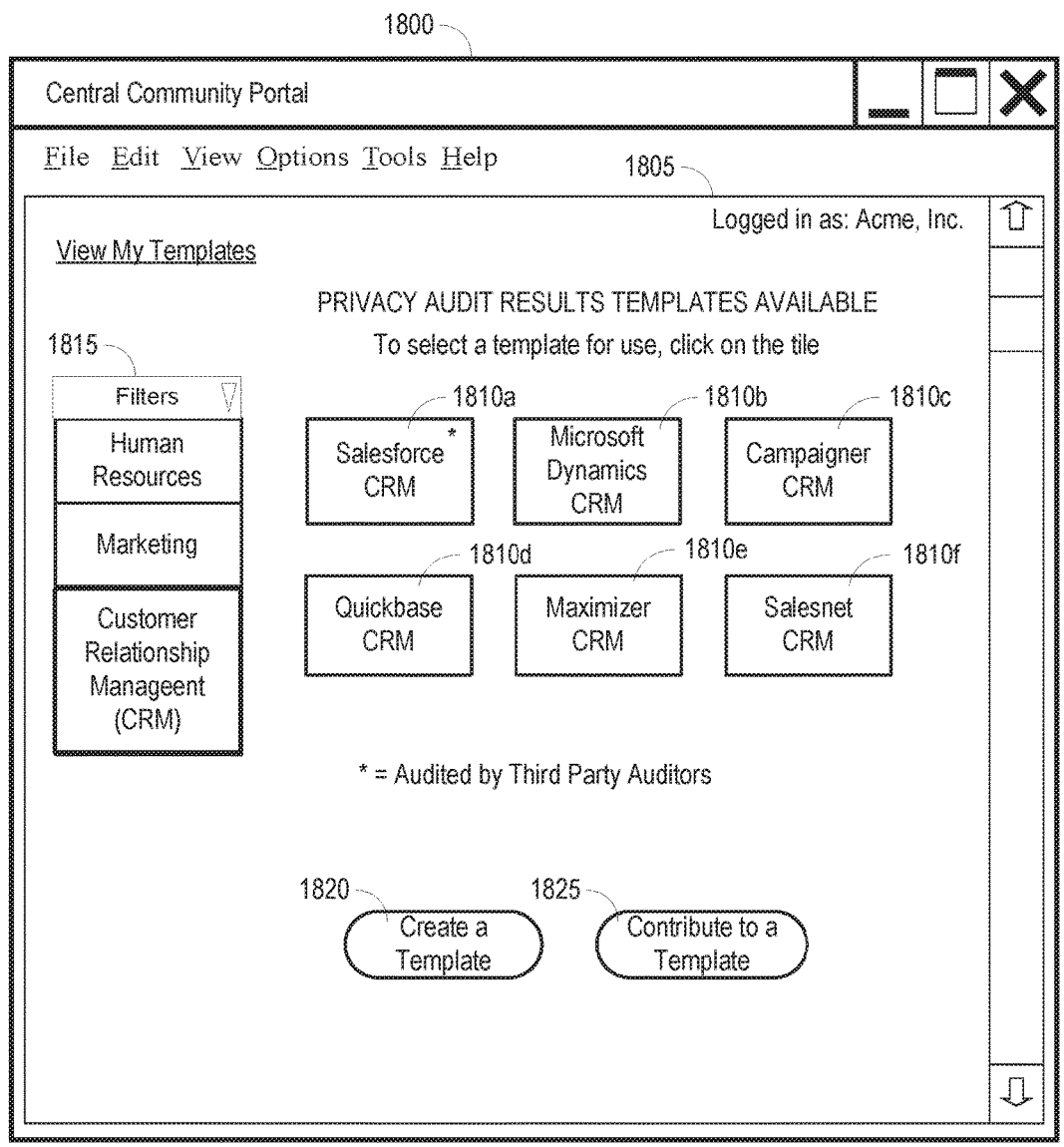
FIG. 18 is an example of a GUI showing a central community portal for audit results templates.

I. FIG. 18: Central Community Portal for Templates

In particular embodiments, the system 100 may include an online portal and community (e.g., central community portal 1800) that includes a listing of a plurality of the templates discussed above. In a particular embodiments, any appropriate party (e.g., a participating vendor or other member of the on-line community) may use the system 100 to submit a template that is specific to a particular vendor, product, or service. If the template is submitted by a party that is formally associated with the vendor, product, or service that is the subject of the template, the template may be tagged in any appropriate way as "official." For example, if a particular vendor provides a template for their own company, the template may be tagged as being the official template of the vendor. Similarly, if a software company that produces a particular software application provides an official template for the software application, the template may be tagged as being the official template of the software application. In particular embodiments, each organization that is running a particular instance of the system may have access to, and may be authorized to selectively download, templates from the central community portal 1800.

FIG. 18 is an example embodiment of a central community portal 1800, which may, for example, include any suitable user interface (e.g., a suitable graphical user interface, such as a browser window) for displaying and providing privacy audit results templates.

As shown in FIG. 18, a customer (in this example, Acme, Inc.) can log into the central community portal 1800, and the client community portal 1800 shows the client login indicator 1805. The client community portal can display one or more templates available for the customer to access. One or more of the templates may be displayed as visual representations such as icons, tiles, filenames, folders, images, and the like. In this example interface, templates 1810*a*, 1810*b*, 1810*c*, 1810*d*, 1810*e*, and 1810*f* are displayed as tiles that are selectable by the user (customer). In the example shown, a template for a particular vendor, SalesForce, is displayed as a tile with the label "SalesForce" on it (See 1810*a*). Each visual representation may include an indicator as to whether the template has been submitted by the vendor itself or by a third party. If a vendor has created the template, then it may bear an indication that the template is official. The template may also include a visual indicator indicating that the template's question/answer pairings have (or have not been) been audited by a third party (e.g., a third-party compliance assessor). In the example shown in FIG. 18, the template 1810*a* for SalesForce CRM is designated with an asterisk to indicate that the template is official.

In various embodiments, the system 100 is adapted to allow a customer to filter the templates based upon any suitable characteristic of the templates. In particular embodiments, each template may have, associated with it, suitable metadata (or any other suitable data elements) that may be used to facilitate this filtering process. For example, each template may have metadata associated with it that indicates: (1) a particular type of product that the template is associated with (e.g., accounting software); (2) a particular type of vendor that the template is associated with; (3) a particular type of service that the template is associated with, or any other suitable information. This metadata can be used by the system, for example, to determine which visual representations to display. The result is that a user can choose to display, for example, all of the templates that are classified as customer relationship management (CRM) software, or any other appropriate category of software. In the example shown in FIG. 18, the customer has chosen to filter out any templates that are not related to CRM software using filter 1815. This leaves templates 1810*a-f*, which are all templates related to CRM software provided by different vendors.

As indicated in FIG. 18, if a customer indicates a desire to obtain or acquire rights to use one or more of the templates, the customer can simply select a template by clicking on the corresponding tile for the template. If the customer the selects a template, the system 100 may make the template available for access by the customer. The system may do this, for example, by associating the template with an account of the customer for future use. The system 100 may also, or alternatively, provide the customer with access by allowing the customer to download the template and store it within a repository associated with the customer, which may be local or networked. In particular embodiments, a customer may view the templates associated with the customer by selecting the "View My Templates" hyperlink show the client community portal 1800.

FIG. 18 shows an example graphical user interface that a customer may use to create a new template or edit an existing template by, respectively, selecting a "create a new template" button 1825 or a "contribute to a template" button 1825. If the customer has chosen to either create a new template or modify an existing one, the system 100 may submit the new template, or modifications to the existing one, for review and auditing. That is, the new template (or new modifications) may be reviewed by the proprietors of the system 100, and compliance assessors, before being digitally stored as a template and then provided as a template as part of the central community portal 1800. In other embodiments, new or modified templates aren't centrally reviewed, or are only selectively reviewed before being added to the central community portal 1800.

Figure 19:
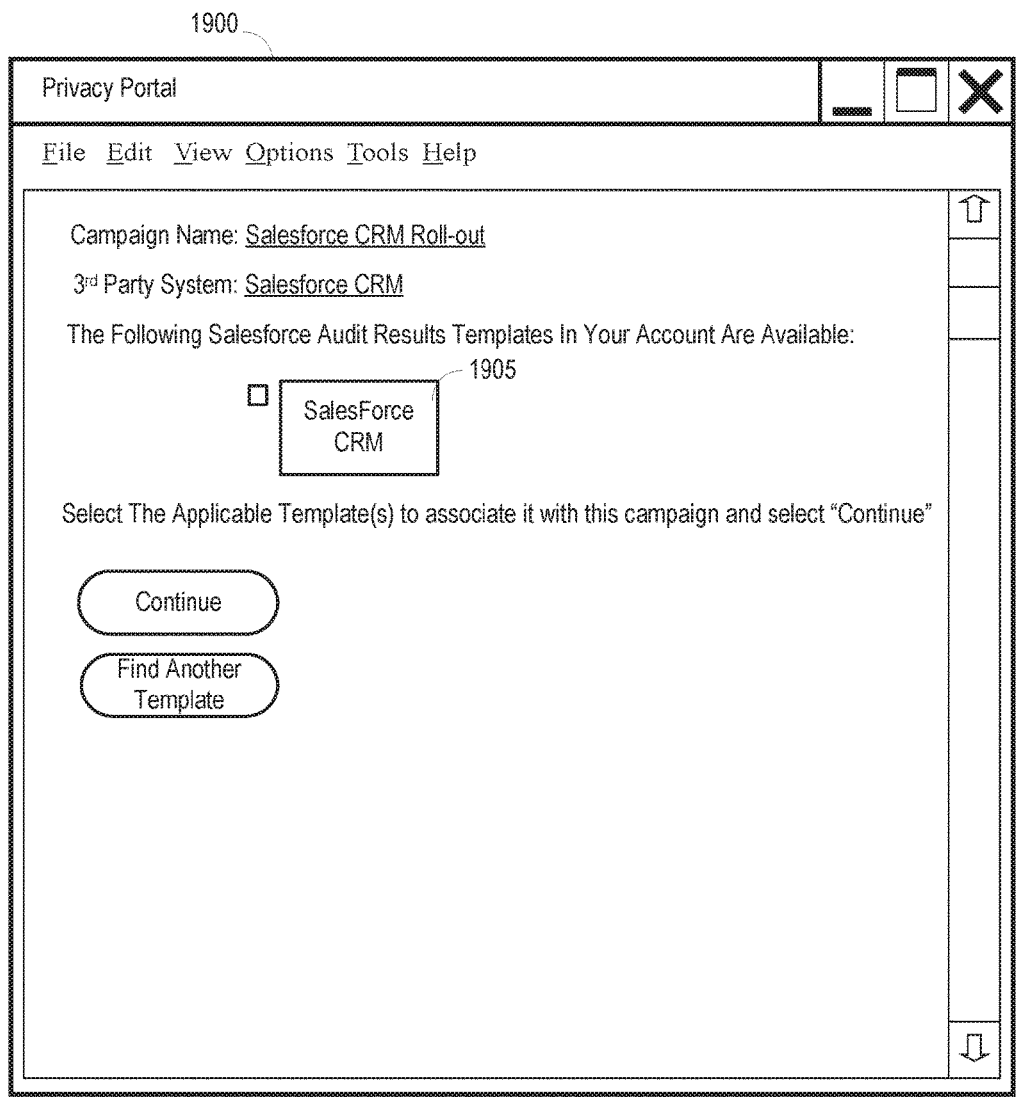
FIG. 19 is an example of a GUI showing a page that allows for the association of one or more templates with a privacy campaign.

J. FIG. 19: Template Association with Privacy Campaign

FIG. 19 is an example of a graphical user interface (template selection interface 1900) that the system may use to allow users to search for and select templates to associate with a particular privacy campaign. The system may display this interface, for example, when a user is setting up a new privacy campaign. In this example, the system may, for example, prompt the user to enter information about third-party software that is the subject of the privacy campaign (e.g., Salesforce CRM), and then search the user's account to identify any templates that are currently associated with the user's account and related to the third-party software (in this case, the SalesForce CRM template 1905).

As shown in FIG. 19, the system may be adapted to allow a customer to select a check box next to an indicia that corresponds to an available template for the third-party software, and then select the box "Continue" to associate the template with the current privacy campaign. The system may then digitally associate the template selected by the customer with the current privacy campaign.

If the system is unable to identify any suitable templates that are currently associated with the user's account, the user may select the "Find Another Template" button, which may allow the customer to access, for example, a central community portal (such as the central community portal 1800 described above) so that the customer can select a suitable template from the community portal.

Figure 20:
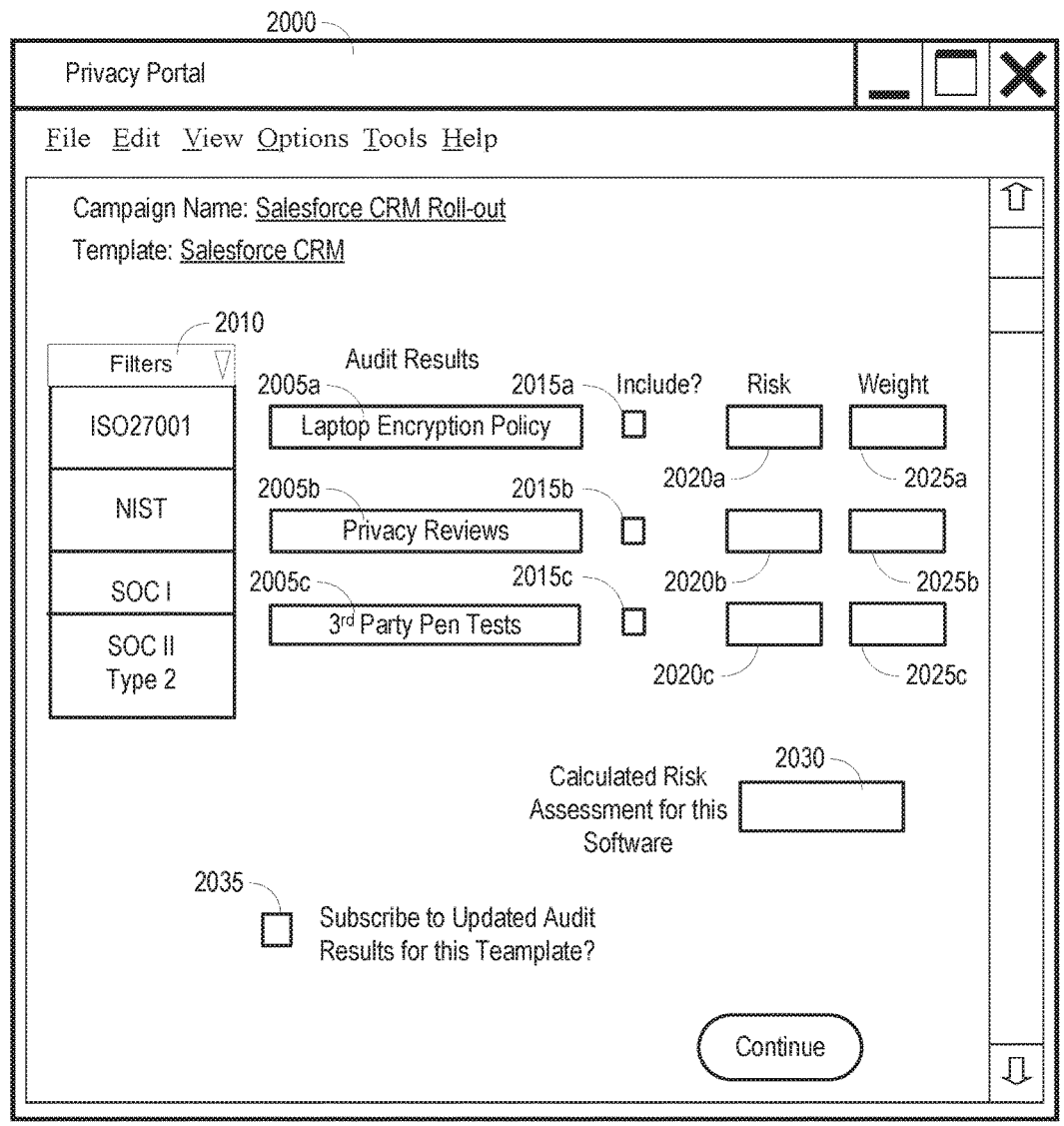
FIG. 20 is an example of a GUI showing a page that allows for the selection of one or more completed templates.

Selecting the "Continue" button in the template selection interface 1900 associates the selected template(s) with the current campaign, and may advance the customer to the interface shown in FIG. 20.

K: FIG. 20: Audit Results Selection

FIG. 20 illustrates an example graphical user interface (audit result selection interface 2000) that allows a customer to determine and select which question/answer pairings from a particular template to keep with the privacy campaign. The audit result selection interface 2000 may list the name of the campaign (e.g. Salesforce CRM Roll-out) and the name of the template (e.g., Salesforce CRM).

Still referring to FIG. 20, the audit results of the template may be displayed to the user. Each audit result may include one or more question/answer pairings (or one or more groups of question/answer pairings) regarding a particular set of features related to the vendor, product, or service covered by the template. For example, one set of audit results 2005a may include question/answer pairings (e.g., electronic prompts and responses) related to a particular vendor's laptop encryption policy. Another audit result 2005b may include one or more question/answer pairings related to privacy reviews associated with the vendor. Another audit result 2005c may include one or more question/answer pairings related to third-party penetration tests of one or more of the vendor's systems.

In particular embodiments, if the system 100 receives a request from the user to filter the audit results displayed (e.g., by using filter selector 2010), the system may only display a subset of the question/answer pairings. For example, the customer may not observe ISO27001 or SOC I, so the customer may choose not to select those two assessment standards when viewing a particular set of audit results. If the customer does not choose to filter the audit results, then the system may, in various embodiments, display of all the question/answer pairings associated with the template.

The audit result selection interface 2000 may also include selectors 2015a-c associated with each audit result that allows the customer to choose whether to include the question/answer pairings with the privacy campaign.

The audit result selection interface 2000 may include multiple fields (e.g., fields 2020a-c and fields 2025a-c) to receive, from the customer, entries of respective risk ratings and weighting factors for each question/answer pairing that the customer selects for the campaign. As mentioned above, the system may initially populate the fields with a default value, editable by the user. The relative risk ratings and weighting factors may be used, by the system, to calculate an aggregate risk score for the software application. That calculated numerical risk value may be presented in field 2030.

Prior to continuing, the customer may check a box on the audit result selection interface 2000 that indicates that the customer wishes subscribe to updated audit results for the template related to the sales campaign. If the customer chooses this selector 2035, the customer may receive updates, in accordance with the discussion of FIG. 11 above.

Figure 21:
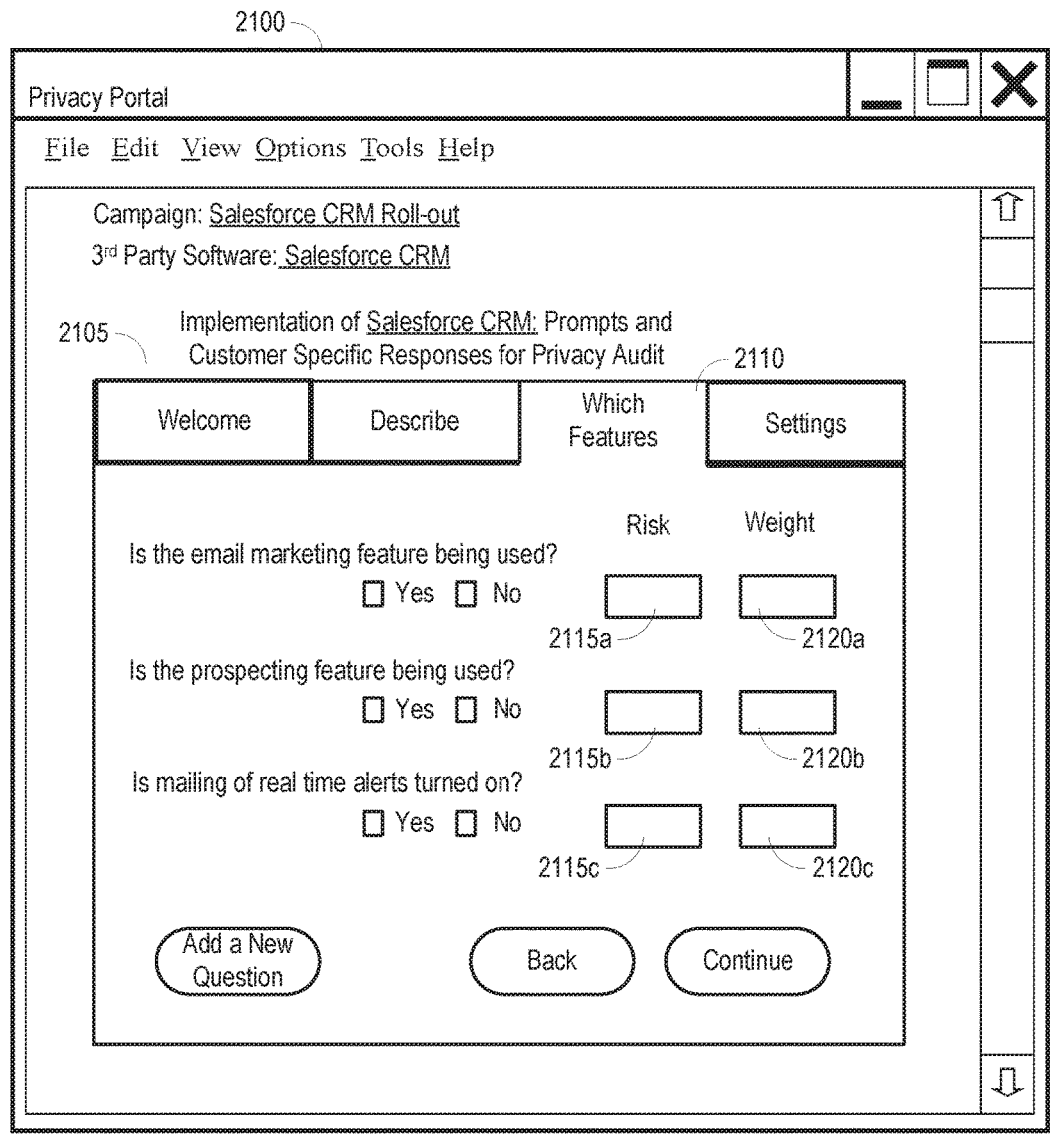
FIG. 21 is an example of a GUI showing a page that depicts prompts and responses (questions and corresponding answers) related to Customer Implementation template association with a privacy campaign.

L: FIG. 21: Prompts and Responses Related to Customer Implementation

FIG. 21 depicts a graphical user interface 2100 for obtaining privacy-related answers to questions related to the user's specific implementation of the vendor's software. Prior to this point, the audit results containing questions and answers were derived from a template and associated with the campaign. The questions and answers were of the type that the software vendor would answer the same regardless of who the customer is. Here, graphical user interface 2100 presents a customer with questions for information regarding the customer's implementation of the software application associated with the privacy campaign, wherein the questions regarding the customer's implementation relate to one or more privacy assessment standards.

As shown in FIG. 21, the system may present the questions in a step-by-step fashion (i.e., using a "wizard" such as wizard 2105). The wizard 2105 may have tabs for each set of questions. Under the tab "Which features" 2110, the questions might relate to, for example, which features of the vendor's software the customer has implemented. Example questions might be, "Is the email marketing feature being used?" or "Are real time email alerts turned on?" These are questions that the vendor typically cannot answer, as they relate to the customer's specific implementation of the vendor's software. The customer can respond to the questions by, for example, selecting the yes/no boxes shown under each question. To allow for more customization, if the customer believes that there were questions and answers that were unaccounted for during the process, the customer can add a new question and respond to that question (e.g., using the "Add a New Question" button).

As with the audit results, the customer can also assign relative risk ratings and weighting factors for each question and answer. These values can be entered into fields 2115a-c and fields 2120a, and can be taken into account when calculating the risk level for the entire campaign.

CONCLUSION

Although embodiments above are described in reference to various systems and methods for creating and managing data flows related to individual privacy campaigns, it should be understood that various aspects of the system described above may be applicable to other privacy-related systems, or to other types of systems, in general. For example, the functionality described above for obtaining the answers to various questions (e.g., assigning individual questions or sections of questions to multiple different users, facilitating collaboration between the users as they complete the questions, automatically reminding users to complete their assigned questions, and other aspects of the systems and methods described above) may be used within the context of Privacy Impact Assessments (e.g., in having users answer certain questions to determine whether a certain project complies with an organization's privacy policies).

While this specification contains many specific embodiment details, these should not be construed as limitations on the scope of any invention or of what may be claimed, but rather as descriptions of features that may be specific to particular embodiments of particular inventions. Certain features that are described in this specification in the context of separate embodiments may also be implemented in combination in a single embodiment. Conversely, various features that are described in the context of a single embodiment may also be implemented in multiple embodiments separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

Many modifications and other embodiments of the invention will come to mind to one skilled in the art to which this invention pertains having the benefit of the teachings presented in the foregoing descriptions and the associated drawings. While examples discussed above cover the use of various embodiments in the context of operationalizing privacy compliance and assessing risk of privacy campaigns, various embodiments may be used in any other suitable context. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for the purposes of limitation.

We claim:

1. A computer-implemented data processing method for efficiently assessing the risk associated with a privacy campaign, the method comprising:
   receiving, by one or more computer processors, a completed privacy template from a centralized repository of completed privacy templates, the completed privacy template comprising a plurality of question/answer pairings regarding a particular vendor, product or service to be used as part of the privacy campaign;
   after receiving the completed privacy template, receiving, from a user, a particular weighting factor that is to be applied to at least a particular one of the question/answer pairings in processing data to calculate a risk rating for the privacy campaign;
   after receiving the particular weighting factor, using the particular weighting factor and the content of the particular question/answer pairing to calculate a risk rating for the privacy campaign by:
      identifying a respective weighting factor for each of the plurality of question/answer pairings, wherein the plurality of question answer pairings identify at least:
         a nature of data collected by the particular vendor, product or service to be used as part of the privacy campaign;
         a physical storage location of the data collected by the particular vendor, product or service to be used as part of the privacy campaign;
         a number of individuals having access to the data collected by the particular vendor, product or service to be used as part of the privacy campaign; and
         a type of individual from which the data is collected by the particular vendor, product or service to be used as part of the privacy campaign;
      electronically determining a relative risk rating for each of the plurality of question/answer pairings; and
      electronically calculating the risk rating based upon, for each of the plurality of question/answer pairings, the relative risk rating and the weighting factor;
   determining whether the risk rating for the privacy campaign meets certain pre-determined criteria; and
   in response to determining that the risk rating for the privacy campaign does not satisfy the pre-determined criteria, generating an alert to a user indicating that the risk rating for the privacy campaign does not satisfy the pre-determined criteria.

2. The computer-implemented data processing method of claim 1, wherein:
   the particular weighting factor is a first weighting factor;
   the particular one of the question/answer pairings is a first particular one of the question/answer pairings;
   the risk rating for the privacy campaign is a first risk rating for the privacy campaign; and
   the system is further adapted for:
      receiving, by one or more computer processors, an updated version of the completed privacy template from the centralized repository of completed privacy templates, the updated completed privacy template comprising an updated plurality of question/answer pairings regarding the particular vendor, product or service;
      after receiving the updated completed privacy template, receiving, from a user, a second weighting factor that is to be applied to at least a specific one of the question/answer pairings in calculating a risk rating for the privacy campaign;
      after receiving the second weighting factor, using the second weighting factor and the content of the specific question/answer pairing to calculate a second risk rating for the privacy campaign;
      determining whether the second risk rating for the privacy campaign meets particular pre-determined criteria; and in response to determining that the second risk rating for the privacy campaign does not satisfy the particular pre-determined criteria, generating an alert to a user indicating that the second risk rating for the privacy campaign does not satisfy the particular pre-determined criteria.

3. The computer-implemented data processing method of claim 1, further comprising facilitating, by one or more computer processors, a selection of one or more of the question/answer pairings to not consider in calculating the risk rating for the privacy campaign; and in response to receiving the selection, not considering the question/answer pairing in calculating the risk rating for the privacy campaign.

4. The computer-implemented data processing method of claim 1, wherein the completed privacy template has been centrally pre-audited prior to the step of receiving, by one or more computer processors, the completed privacy template from a centralized repository of completed privacy templates.

5. A computer-implemented data processing method for efficiently assessing the risk associated with a privacy campaign, the method comprising:
  receiving, by one or more computer processors, a completed privacy template from a particular vendor, the completed privacy template comprising a plurality of question/answer pairings regarding a particular product or service provided by the vendor, the plurality of question answer pairings comprising each of:
    an identification of one or more types of personal data collected by the particular product or service;
    storage information for one or more pieces of personal data collected by the particular product or service; and
    access permission data associated with the one or more pieces of personal data collected by the particular product or service;
  in response to receiving the completed privacy template, automatically coordinating, by one or more computer processors, an audit of the completed privacy template, wherein:
    coordinating the audit comprises calculating a risk rating for the particular product or service provided by the vendor based at least in part on the one or more types of personal data collected by the particular product or service, the storage information for the one or more pieces of personal data collected by the particular product or service, and the access permission data associated with the one or more nieces of personal data collected by the particular product or service by; and
    calculating the risk rating for the particular product or service comprises:
      identifying a weighting factor for each of the plurality of question/answer pairings;
      electronically determining a relative risk rating for each of the plurality of question/answer pairings; and
      electronically calculating the risk rating based upon, for each of the plurality of question/answer pairings, the relative risk rating and the weighting factor;
  digitally storing the risk level for the particular product or service and the audited privacy template in computer memory; and
  after the audit is complete, facilitating the electronic transfer of the audited privacy template, via one or more computer networks, to a plurality of computer systems, each computer system being associated with a different entity, for use in the different entities' respective computerized assessments of at least one respective privacy campaign, to be executed by the respective entity, that includes the use of a product or service that is the subject of the completed privacy template.

6. The computer-implemented method of claim 5, further comprising:
  receiving, by one or more computer processors, an updated version of the completed privacy template, the updated completed privacy template comprising an updated plurality of question/answer pairings regarding the particular vendor, product or service;
  in response to receiving the updated completed privacy template, automatically coordinating, by one or more computer processors, an audit of the updated completed privacy template; and
  after the audit of the updated completed privacy template is complete, facilitating the electronic transfer of the audited updated completed privacy template, via one or more computer networks, to a plurality of computer systems, each computer system being associated with a different entity, for use in the different entities' respective computerized assessments of at least one respective privacy campaign, to be executed by the respective entity, that includes the use of a product or service that is the subject of the completed privacy template.

7. The computer-implemented method of claim 5, wherein the audit of the completed privacy template is an audit for compliance with one or more privacy standards.

8. A computer-implemented data processing method for providing templates having privacy audit results comprising:
  digitally storing a plurality of sets of digital data comprising audit results in an electronic repository, wherein:
    each of the plurality of sets of digital data relate to software provided by a vendor;
    the audit results comprise prompts and responses that relate to compliance with one or more assessment standards related to privacy, and wherein:
      the prompts and responses have been audited for privacy compliance; and
      the method comprises determining the audit results by calculating a risk level for each of the plurality of sets of digital data by:
        identifying a weighting factor for each of the prompts and response, the prompts and responses including:
          an identification of a type of personal data collected by the software provided by the vendor;
          an identification of a physical storage location of the personal data collected by the software; and
          an identification of a length of time that the personal data collected by the software will be stored;
        electronically determining a relative risk rating for each of the prompts and responses; and
        electronically calculating the risk level based upon, for each of the prompts and responses, the relative risk rating and the weighting factor;
  displaying, in a graphical user interface, a plurality of visual representations, each visual representation corresponding to one of the plurality of sets of digital data comprising the audit results;

receiving a selection by a customer indicating a desire to acquire rights to use one or more of the plurality of sets of digital data comprising the audit results; and in response to the customer selection, electronically making available for access to the customer one or more of the plurality of sets of digital data comprising the audit results.

9. The data processing method of claim 8, wherein each of the plurality of sets of digital data comprises a data element relating to a classification of the software to which each set of digital data relates.

10. The data processing method of claim 9, wherein displaying in a graphical user interface the plurality of visual representations further comprises displaying a subset of the plurality of visual representations based on a command by the customer to display the visual representations based on the classification of the software.

11. The data processing method of claim 8, wherein electronically making available for access to the customer comprises associating the one or more of the plurality of sets of digital data comprising the audit results with an account of the customer.

12. The data processing method of claim 8, further comprising displaying on a display device of the customer one or more visual representations of the one or more of the plurality of sets of digital data associated with the customer's account.

13. A computer-implemented data processing method for selecting audit results of a template for use with privacy audits associated with a privacy campaign comprising:

receiving a customer command to add a privacy campaign, the privacy campaign having associated with it a software application;

receiving an electronic selection by a customer indicating a desire to associate with the privacy campaign a set of digital data comprising audit results, wherein:
the audit results comprise prompts and responses that relate to compliance with one or more assessment standards related to privacy, and wherein the method comprises auditing the prompts and responses for privacy compliance by:
identifying a weighting factor for each of the prompts and responses, the prompts and responses including:
an identification of a type of personal data collected by the software application;
an identification of a physical storage location of the personal data collected by the software application; and
an identification of a length of time that the personal data collected by the software application will be stored;
electronically determining a relative risk rating for each of the prompts and responses;
electronically calculating a risk level based upon, for each of the prompts and responses, the relative risk rating and the weighting factor, and
associating the risk level with the audit results;
associating the set of digital data selected by the customer with the privacy campaign;
digitally storing the set of digital data selected by the customer as an electronic record associated with the privacy campaign.

14. The data processing method of claim 13, wherein the software application is provided by a third party to the customer.

15. The data processing method of claim 13, further comprising:
displaying one or more audit results of the set of digital data on a graphical user interface using one or more visual indicators selected from a group consisting of: an icon, a tile, a folder, an image, and a filename.

16. The data processing method of claim 15, wherein displaying one or more audit results further comprises:
storing a data element regarding the one or more assessment standards to which each of the one or more audit results relate; and
using the data element to digitally determine which audit results of the one of the plurality of first sets of digital data associated with the privacy campaign to display based on a customer's selection of an assessment standard; and
displaying the one or more audit results based on the data element regarding the one or more assessment standards.

17. The data processing method of claim 13, further comprising:
displaying a selector associated with each audit result that allows a customer to choose whether to include the audit results with the privacy campaign.

18. The data processing method of claim 17, further comprising:
receiving an electronic input from the customer assigning a relative risk rating to each audit result that the customer chooses to include with the privacy campaign; and
using the relative risk rating for each audit result to determine an aggregate risk score associated with the software application associated with the privacy campaign.

19. The data processing method of claim 17, further comprising:
receiving an electronic input from the customer assigning a relative risk rating to each audit result that the customer chooses to include; and
receiving an electronic input from the customer assigning a weighting factor to each audit result that the customer chooses to include; and
using the relative risk rating for each audit result and the weighting factor assigned to each audit result, determining an aggregate risk score associated with the software application associated with the privacy campaign.

20. The data processing method of claim 19, further comprising:
presenting a customer with prompts for information regarding the customer's implementation of the software application associated with the privacy campaign, wherein the prompts regarding the customer's implementation relates to one or more privacy assessment standards; and
accepting responses to the prompts for information regarding the customer's implementation.

21. The data processing method of claim 19, further comprising:
receiving an electronic input from the customer assigning a relative risk rating to one or more prompts for information regarding the customer's implementation and the responses to the prompts for information regarding the customer's implementation; and receiving an electronic input from the customer assigning a weighting factor to one or more prompts for information regarding the customer's implementation and the responses to the prompts for information regarding the customer's implementation; and calculating an aggregate risk level for the privacy campaign using:

the relative risk rating for each audit result and the weighting factor assigned to each audit result; and the relative risk rating for each prompt and response regarding the customer's implementation and the weighting factor assigned for each prompt and response regarding the customer's implementation.

22. The data processing method of claim 21, further comprising:

receiving from the customer a command to add a new prompt regarding the customer's implementation.

23. The data processing method of claim 22, further comprising:

generating for display a computer-generated user interface comprising an inventory page, wherein the inventory page displays a list of a plurality of campaigns and visual indicators that relate to the risk level for each listed campaign.

* * * * *

UNITED STATES PATENT AND TRADEMARK OFFICE
CERTIFICATE OF CORRECTION

PATENT NO. : 9,892,442 B2
APPLICATION NO. : 15/619212
DATED : February 13, 2018
INVENTOR(S) : Kabir A. Barday Page 1 of 1

It is certified that error appears in the above-identified patent and that said Letters Patent is hereby corrected as shown below:

In the Claims

At Claim 5, Column 41, Line 49, replace the word "nieces," with the word -- pieces --

At Claim 8, Column 42, Line 49, replace the word "response" with the word -- responses --

Signed and Sealed this
Fourteenth Day of August, 2018

Andrei Iancu
*Director of the United States Patent and Trademark Office*